US008689287B2

(12) United States Patent
Bohmer et al.

(10) Patent No.: US 8,689,287 B2
(45) Date of Patent: Apr. 1, 2014

(54) FEDERATED CREDENTIALING SYSTEM AND METHOD

(75) Inventors: Iana Livia Bohmer, Kensington, MD (US); John Stephen Radzikowski, Falls Church, VA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 377 days.

(21) Appl. No.: 11/505,333

(22) Filed: Aug. 17, 2006

(65) Prior Publication Data
US 2008/0046984 A1    Feb. 21, 2008

(51) Int. Cl.
| G06F 17/00 | (2006.01) |
| H04L 29/06 | (2006.01) |
| G06F 7/04 | (2006.01) |
| G06F 15/16 | (2006.01) |
| G06F 17/30 | (2006.01) |
| G06F 15/173 | (2006.01) |

(52) U.S. Cl.
USPC ............. 726/2; 726/1; 726/5; 726/8; 726/10; 709/225

(58) Field of Classification Search
USPC ............. 235/491, 462.1; 707/2, 10; 709/225; 726/1, 5, 8, 10, 2
See application file for complete search history.

(56) References Cited

U.S. PATENT DOCUMENTS

| 5,778,072 | A * | 7/1998 | Samar ............................. 380/30 |
| 6,930,707 | B2 * | 8/2005 | Bates et al. ...................... 348/78 |
| 7,028,902 | B2 * | 4/2006 | Xu et al. ..................... 235/462.1 |
| 7,134,603 | B2 * | 11/2006 | Batoha .......................... 235/491 |
| 2003/0046544 | A1 * | 3/2003 | Roskind et al. ............... 713/176 |
| 2006/0021019 | A1 * | 1/2006 | Hinton et al. ................... 726/10 |
| 2006/0236382 | A1 * | 10/2006 | Hinton et al. ..................... 726/8 |
| 2007/0056025 | A1 * | 3/2007 | Sachdeva et al. ................. 726/5 |

(Continued)

FOREIGN PATENT DOCUMENTS

EP    0 936 530 A1 *    8/1999    ............... G06F 1/00

OTHER PUBLICATIONS

More Than a Pretty Face, Biometrics and SmartCard Tokens SANS Institute InfoSec Reading Room © SANS Institute 2002.*

(Continued)

*Primary Examiner* — Kambiz Zand
*Assistant Examiner* — Benjamin Kaplan
(74) *Attorney, Agent, or Firm* — Andrews Kurth LLP; Sean S. Wooden; Matthew J. Esserman

(57) ABSTRACT

A federated credentialing system, and a correspond method, includes credential issuers that interact with relying parties to provide system users with access to protected resources within the system. The system includes a relying party federated domain server including devices for identifying users and authenticating user access credentials and a credential issuer domain server including devices for verifying user identities and access credentials. The access credentials may be single smart cards. The single smart cards are operative to provide user access to both logical and physical protected resources of the relying party. The system also includes a federated trust broker in communication in communication with the relying party and credential issuer federated domain servers. The trust broker receives authorization requests from the relying party, routes the received requests to the credential issuer and receives in return authorization responses from the credential issuer and routes the responses to the relying party. The relying party grants users access to the physical and the logical protected resources based on information contained in the responses.

34 Claims, 23 Drawing Sheets

(56) References Cited

U.S. PATENT DOCUMENTS

| | | | | |
|---|---|---|---|---|
| 2008/0010287 A1* | 1/2008 | Hinton et al. | | 707/10 |
| 2008/0010288 A1* | 1/2008 | Hinton et al. | | 707/10 |
| 2008/0010665 A1* | 1/2008 | Hinton et al. | | 726/1 |
| 2008/0021866 A1* | 1/2008 | Hinton et al. | | 707/2 |
| 2008/0021997 A1* | 1/2008 | Hinton | | 709/225 |

OTHER PUBLICATIONS

The Federation for Identity and Cross-Credentialing Systems (FiXs)—Overview © 2009 FiXs.*

Homeland Security Presidential Directive/Hspd-12 Aug. 27, 2004 Retireved from http://csrc.nist.gov/drivers/documents/Presidential-Directive-Hspd-12.html.*

GSA Office of Governmentwide Policy EAP and EAI Alignment: FiXs Pilot Project Dec. 14, 2005.*

"Technical Implementation Guidance: Smart Card Enabled Physical Access Control Systems", PACS Implementation Guidance, version 2.2; Jul. 30, 2004, pp. 1-32.

Wilson, Charles, et al., "Biometric Data Specification for Personal Identity Verification", National Institute of Standard and Technology, NIST Special Publication 800-76, Feb. 1, 2006, pp. 1-31.

Schwarzhoff, Teresa, et al., "Government Smart Card Interoperability Specification", National Institute of Standards & Technology, Interagency Report 6887, Jul. 16, 2003.

Federal Information Processing Standards Publication, "Personal Identity Verification (PIV) of Federal Employees and Contractors", National Institute of Standards & Technology, Mar. 2006, pp. 1-78.

* cited by examiner

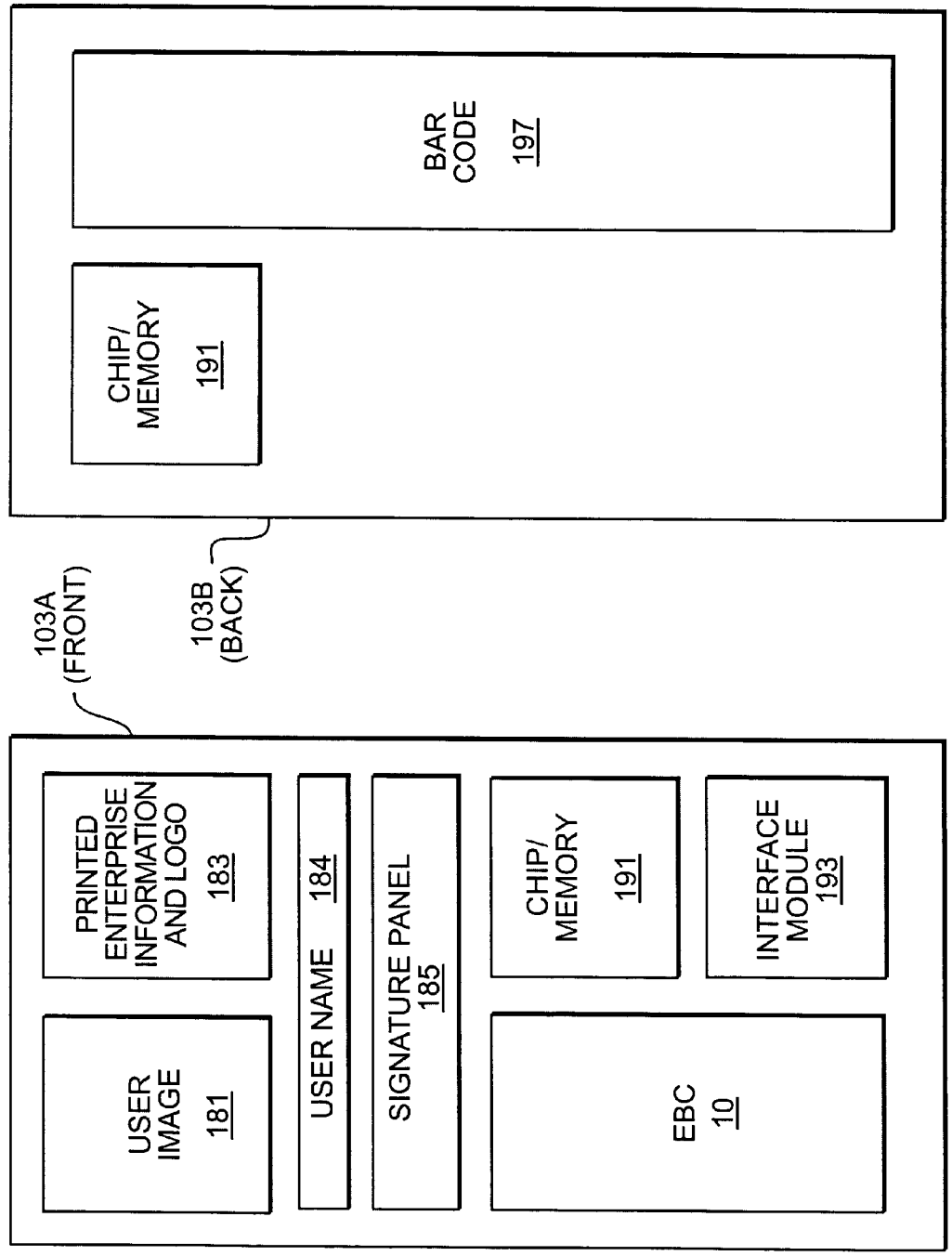

FEDERATED CREDENTIALING SYSTEM AND METHOD

TECHNICAL FIELD

The technical field is systems and methods that provide physical and logical access to protected resources.

BACKGROUND

Enterprises generally desire to provide authorized users with secure access to protected resources in a user-friendly manner throughout a variety of networks, including the Internet. Although providing secure authentication mechanisms reduces the risks of unauthorized access to protected resources, those authentication mechanisms may become barriers to accessing protected resources.

To reduce the costs of user management and to improve interoperability among enterprises, federated computing spaces have been created. A federation is a loosely coupled affiliation of enterprises which adhere to certain standards of interoperability; the federation provides a mechanism for trust among those enterprises with respect to certain computational operations for the users within the federation. For example, a federation partner may act as a user's home domain or identity provider. Other partners within the same federation may rely the user's home domain for primary management of the user's authentication credentials, e.g., accepting a token that is provided by the user's home domain.

However, this federated approach to authentication does not relieve a given federation partner of the necessity of maintaining and managing a local account for a particular user such that the local account contains user-specific information with respect to the given federation partner, thereby allowing the given federated partner to manage accessibility to resources at the given federated partner with respect to that particular user.

Hence, when a user is certified for access to the user's home domain, there still is a need to certify the user in some manner to federated partners; otherwise, the user may discover that resources at the other federated partners are inaccessible, thereby defeating the purpose of the federation.

SUMMARY

What is disclosed is a federated credentialing system in which a plurality of credential issuers interact with a plurality of relying parties to provide system users with access to protected resources within the system. The system includes a relying party federated domain server including means for identifying users and authenticating user access credentials and a credential issuer domain server including means for verifying user identities and access credentials, wherein the access credentials comprise single smart card means, and wherein the single smart card means are operative to provide user access to both logical and physical protected resources of the relying party. The system also includes a federated trust broker in communication in communication with the relying party and credential issuer federated domain servers, wherein the trust broker receives authorization requests from the relying party, routes the received requests to the credential issuer and receives in return authorization responses from the credential issuer and routes the responses to the relying party, and wherein the relying party grants users access to the physical and the logical protected resources based on information contained in the responses.

Also disclosed is a method for granting access to protected logical and physical resources in a federated credentialing network comprising a plurality of relying parties and a plurality of credential issuers. The method includes, at a relying party, receiving a request from a user to access a protected resource, the user providing a user access credential including digital data related to the user; identifying a credential issuer responsible for the user; formulating an authorization request; and sending the authorization request to a trust broker operating on the federated credentialing network. The method further includes, at the trust broker; translating the authorization request into a format required by the credential issuer; and sending the translated authorization request to the identified credential issuer, Finally, the method includes, at the credential issuer, providing information, according to agreed-upon operating rules, sufficient to verify an identity of the user and to authenticate the user access credential; and sending the information to the relying party through the trust broker in an authorization response, wherein the relying party grants access to the protected resource based on comparing information in the authorization response to information provided from the access credential.

Further, what is disclosed is a method for granting access to protected resources in a federated network of unrelated enterprises. The method includes establishing a set of operating rules, wherein each enterprise agrees to conform to the operating rules; establishing a trust relationship among the enterprises, the trust relationship allowing the enterprises to communicate protected resource access authorization requests and corresponding responses according to the operating rules, wherein information supplied in the responses can be trusted for granting access to the protected resources; and presenting an access request to an enterprise, the access request specifying a logical or a physical protected resource, the access request presented in conjunction with presentation of a single smart card means that conforms to the operating rules and that operates to allow access to either of the physical and the logical protected resource.

DESCRIPTION OF THE DRAWINGS

A federated credentialing system and method will be described with reference to the following drawings in which like numerals refer to like devices, and in which:

FIGS. 1A-1M illustrate various components of a federated credentialing system and corresponding method;

DETAILED DESCRIPTION

Figure 1A:
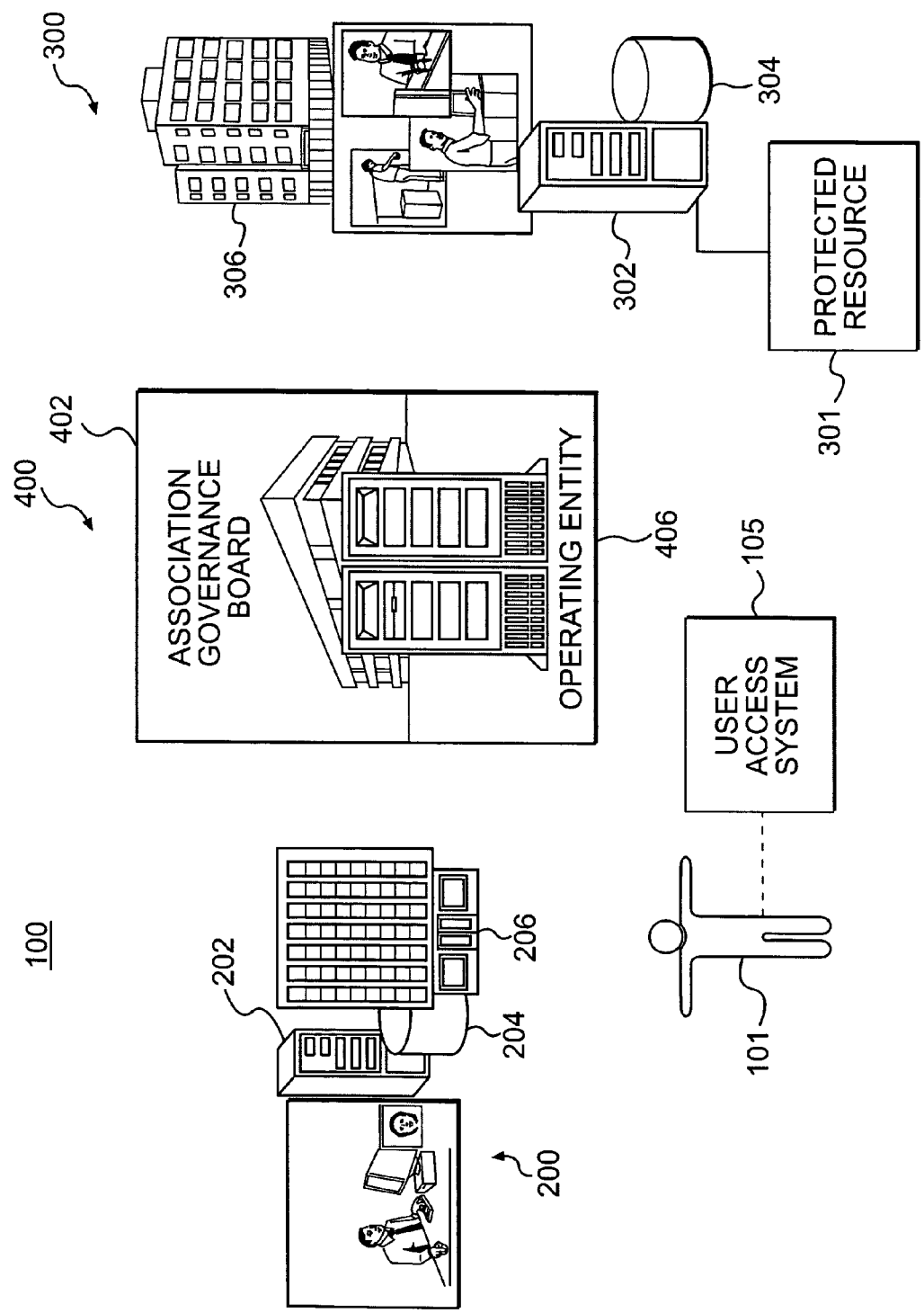

Homeland Security Presidential Directive #12 (HSPD-12) requires the use of a standardized smart identification card (smart card) for access to Federal facilities and systems by Federal government employees and private sector contractors. The subsequent issuance of Federal Information Processing Standard 201 (FIPS 201) provides both the authority and information processing standards available to support interoperable credentials for logical and physical access to protected resources (i.e., security sensitive systems and areas).

However, authority and technical specifications alone are not sufficient for interoperability in a business environment when multiple enterprises need to collaborate to perform work. There remains an immediate need for a set of operating rules and a business model to govern the process of reciprocal recognition of HSPD-12 compliant credential across enterprise domains. When both Federal and private sector employees are engaged in collaborative work across unrelated enterprises, they need an authoritative set of rules that identifies what it means to execute a proper, credential-based access transaction and what to do when the process breaks down. Among other things, the rules are needed to reference applicable technical standards and allocate expected responsibilities, performance and liabilities across the multiple enterprises involved with a federated transaction. In addition, the rules need to be part of a model that treats the rules as a multi-party contract to ensure adherence to expected performance metrics.

Systems that link the credentials of individuals from unrelated enterprises are known as federated credentialing systems. As disclosed herein, these systems manage identities between unrelated enterprises to facilitate the movement and access of users across enterprises. Federated credentialing makes use of emerging technologies, such as single sign-on (SSO) and Web services architectures, which depend on digital identities that are portable across enterprises. Using a SSO architecture, a federated credentialing system can allow authorized users rapid access to protected logical resources without requiring the users' identities and personal information to be stored centrally.

Physical access control systems (PACS) do not share the same characteristics as logical access systems (e.g., SSO). While logical access often focuses on similar user groups requiring access to a common set of applications, physical access focuses on groups based solely on their physical location. Not only may each physical location have a different system using a different technology, but even different locations that share the same technology are not necessarily interoperable. Most existing PACS are operated separately so that users needing access to more than one location must be enrolled separately in each such system. In addition, most users do not need access to all locations, so that the mix of locations to which the user needs access can vary over time. Adding and deleting users to several PACS is cumbersome and costly. The federated credentialing system described herein addresses this problem. However, the federated credentialing system does not provide automated authentication at PACS, but rather identity authentication for the purpose of granting physical access. That is, the herein described federated credentialing system provides authentication at manned stations, but even upon authentication, the authorization to enter (or privilege-granting) still lies with the individual guard manning the PACS entry station.

The federated credentialing system disclosed herein is predicated on interoperability and standardization of user accreditation and access. The need for inter-organizational information exchange for logical access was acknowledged years ago and led to interoperability initiatives for user identity repositories such as X.500, X.509 public key infrastructure, LDAP, and meta-directories. These architectures require either inter-organizational directory lookup or the replication of information from one identity domain to another through data synchronization or delegated administration. Because these architectures require tight coupling with high degrees of symmetry between endpoints (meaning all participating enterprises must agree on a single technology and implementation details), they are not ideal for use in a federated credentialing system. Furthermore, these architectures require the replication of identity data among domains, thereby increasing the risk and liability associated with fraud, security breaches, and privacy violations. The federated credentialing system overcomes these difficulties by defining standards and interactions that must occur during the exchange of user authentication or authorization information. Unrelated enterprises can then map to the common federation standards and apply transformations at the boundaries between identity domains. By adhering to the standards as well as a common governance structure, members of the federated credentialing system can trust each other's assertions and execute successful identity exchanges.

Furthermore, the federated credentialing system can provide for physical and logical access, using a single token or access device, across disparate enterprises. For example, the federated credentialing system can provide access to military and Defense Industrial Base (i.e., commercial) contractor facilities by using a shared, standardized smart card credential, which can also be used for logical access to military and contractor IT protected resources.

More specifically, the herein disclosed federated credentialing system (or federated operating rules-based system), and associated method, support the use of a single HSPD-12 compliant smart card to initiate logical access authentication to security sensitive systems as well as physical access authentication to security sensitive areas.

Before proceeding with a detailed description of the federated operating rules-based system, the following terminology is provided:

The terms "entity" or "party" generally refer to an organization, an individual, or a system that operates on behalf of an organization, an individual, or another system. The term "domain" connotes additional characteristics within a network environment, but the terms "entity," "party," and "domain" can be used interchangeably. For example, the term "domain" may also refer to a DNS (Domain Name System) domain, or more generally, to a data processing system that includes various devices and applications that appear as a logical unit to exterior entities. A domain can also refer to a type of protected system. For example, a party may have a logical access domain protecting its IT resources, and a physical access domain protecting its physical resources.

The terms "request" and "response" refer to data formatting that is appropriate for the transfer of information that is involved in a particular operation, such as messages, communication protocol information, or other associated information.

A token provides direct evidence of a successful operation and is produced by the entity that performs the operation, e.g., an authentication token that is generated after a successful authentication operation. Thus, a token may be provided as part of an authentication response to an authentication request.

A smart card is an authentication and identity device that can be used among the various members of the federated operating rules-based system. The U.S. government has established standards, known as the Government Smart Card Interoperability Specification (GCCIS), incorporated herein by reference, for smart cards that provide logical access.

An assertion provides evidence of some action. Assertions may provide evidence of identity, authentication, attributes, authorization decisions, or other information and/or operations.

A Security Assertion Markup Language (SAML) assertion is an example of a possible assertion format that may be used within the federated operating rules-based system. SAML has been promulgated by the Organization for the Advancement of Structured Information Standards (OASIS), which is a non-profit, global consortium. SAML is described in "Assertions and Protocol for the OASIS Security Assertion Markup Language (SAML)," Committee Specification 01, May 31, 2002. The Security Assertion Markup Language (SAML) is an XML-based framework for exchanging security information. This security information is expressed in the form of assertions about subjects, where a subject is an entity (e.g., a human or a computer) that has an identity in some security domain. A typical example of a subject is a person, identified by his e-mail address in a particular Internet DNS domain.

Assertions can convey information about authentication acts performed by subjects, attributes of subjects, and authorization decisions about whether subjects are allowed to access certain resources. Assertions are represented as XML constructs and have a nested structure, whereby a single assertion might contain several different internal statements about authentication, authorization, and attributes. Assertions containing authentication statements merely describe acts of authentication that happened previously. Assertions are issued by SAML authorities, namely, authentication authorities, attribute authorities, and policy decision points. SAML defines a protocol by which clients can request assertions from SAML authorities and get a response from them. This protocol, consisting of XML-based request and response message formats, can be bound to many different underlying communications and transport protocols; SAML currently defines one binding, to SOAP over HTTP. SAML authorities can use various sources of information, such as external policy stores and assertions that were received as input in requests, in creating their responses. Thus, while members always consume assertions, SAML authorities can be both producers and consumers of assertions. The SAML specification states that an assertion is a package of information that supplies one or more statements made by an issuer. SAML allows credential issuers to make three different kinds of assertion statements: authentication, in which the specified subject was authenticated by a particular means at a particular time; authorization, in which a request to allow a specified user to access the specified protected resource has been granted or denied; and attribute, in which the specified user is associated with the supplied attributes. Various assertion formats can be translated to other assertion formats when necessary.

Authentication is the process of validating a set of credentials that are provided by a credential issuer or on behalf of a user. Authentication is accomplished by verifying something that a user knows, something that a user has, or something that the user is, i.e. some physical characteristic about the user. Something that a user knows may include a shared secret, such as a user's password, or by verifying something that is known only to a particular user, such as a user's cryptographic key. Something that a user has may include a smart card or hardware token. Some physical characteristic about the user might include a biometric input, such as a fingerprint or a retinal map.

An access credential presents a set of challenge/response information that is used in various authentication protocols. For example, a username and password combination is the most familiar form of authentication credential. Other forms of information may include various forms of challenge/response information, such as Public Key Infrastructure (PKI) certificates, smart cards, and biometrics, for example. An access credential is differentiated from an authentication assertion in that an access credential is a device or document (e.g., as smart card) presented by a user as part of an authentication protocol sequence with an authentication server or service, and an authentication assertion is a statement about the successful presentation and validation of a user's authentication credentials, subsequently transferred between enterprises when necessary.

Authorization is the process of authenticating a user's access credentials and identifying the user.

A member is an organization, or enterprise, that subscribes to a network, such as the federated operating rules-based system. A member may be a defense contractor, a military organization, at any level, from DOD at the top down to an individual military unit, such as a naval vessel, for example. A member, as used herein, has signed a member partnership agreement to participate in the federated operating rules-based system. A member can participate as a credential issuer, a relying party, or both. A credential issuer is a member that issues compliant credentials to users and processes authentication inquiries from relying parties and provides responses. A relying party is a member that equips one or more of its facility entry stations with compliant equipment and applications to initiate authentication inquiries.

A user is an individual employee or subcontractor of a member. As used herein, a user has been granted, by a credential issuer, some form of access credential (e.g., a smart card) for access to protected resources within the federated operating rules-based system.

An applicant is also an individual who belongs to a member. However, an applicant is in the process of being granted an access credential within the federated operating rules-based system.

A protected resource can be either a physical resource or a logical resource. A physical resource is a secured facility (for example, a building, room, or area) that a user wishes to access. A logical resource includes a network or network location (for example, a server, workstation, database, folder, file, object, page, executable code, or other computational resource, communication-type resource) that the user wishes to access. A logical resource may be identified by a Uniform Resource Locator (URL), or more generally, a Uniform Resource Identifier (URI), that can only be accessed by an authenticated and/or authorized user.

In the federated environment described herein, each enterprise may have its own user registry and may maintain relationships with its own set of users. Each enterprise typically has its own means of authenticating these users. However, the federated scheme allows enterprises to cooperate in a collective manner such that users in one enterprise can leverage relationships with a set of enterprises through an enterprise's participation in a federation of enterprises. In this environment, two enterprises need not have a direct, pre-established, relationship defining how and what information to transfer about a user. Within the federated environment, enterprises provide services that deal with authenticating users, accepting authentication assertions, e.g., authentication tokens, that are presented by other enterprises, and providing some form of translation of the identity of the vouched-for user into one that is understood within the local enterprise.

Within the federated environment, at least two types of "trust domains" may exist: enterprise trust domains and federation trust domains. The differences between these two types of trust domain are based in part on the operating rules governing the trust relationships and in part on the technology used to establish trust. An enterprise trust domain contains those components that are managed by the enterprise; all components within that trust domain trust each other. In general, there are no operating rules required to establish trust within an enterprise because the deployed technology creates inherent trust within an enterprise, for example, by requiring mutually authenticated SSL sessions between components or by placing components within a single, tightly controlled data center such that physical control and proximity demonstrate implicit trust.

Federation trust domains are those that cross enterprise boundaries. From one perspective, a federation trust domain may represent trust relationships between distinct enterprises. In this federation model, a fundamental notion of trust between the federation members is required in order to provide a level of assurance that the assertions (including tokens and attribute information) that are transferred between the members are valid. If there is no trust relationship, then the relying party cannot depend upon the assertions received from the credential issuer, and those assertions they cannot be used by the relying party to determine how to interpret any information received from the credential issuing issuer.

Federation trust domains may be established by using a trust broker or through trust proxies established at each enterprise, or some combination of trust broker and trust proxies. Establishing a federated trust relationship may include the establishment of shared secret keys and operating rules that define the expected and/or allowed authentication credentials, the manner in which the credentials are provided to individual users, and the way individual user access is monitored.

Operating rules that specify contractual obligations and liabilities with respect to the trust relationships between federated enterprises can be expressed in XML through the use of the ebXML (Electronic Business using XML) standards. For example, a direct trust relationship could be represented in an ebXML document; each federation member that shares a direct trust relationship would have a copy of a contract that is expressed as an ebXML document. Operational characteristics for various entities within a federation may be specified within ebXML choreographies and published within ebXML registries; any enterprise that wishes to participate in the federated operating rules-based system would need to conform to the published requirements that were specified by the federation.

Federation eases the administrative burden on service providers. A service provider can rely on its trust relationship with respect to the federation as a whole; the service provider does not need to manage authentication information, such as user password information, because it can rely on authentication that is accomplished by a user's authentication home domain.

Within the federated environment, a federated identity management system provides a foundation in which loosely coupled authentication, user enrollment, user profile management and/or authorization services, collaborate across security domains. Federated identity management allows services residing in disparate security domains to securely interoperate and collaborate even though there may be differences in the underlying security mechanisms and operating system platforms at these disparate domains.

As explained in more detail further below, the federated operating rules-based system allows a user to authenticate at a first entity, i.e., the user's home domain or authentication home domain. This first entity may act as a credential issuer, which issues an authentication assertion about the user for use at a second entity. The user can then access protected resources at a second, distinct entity, termed the relying party, by presenting the authentication assertion that was issued by the first entity without having to explicitly re-authenticate at the second entity. Information that is passed from an issuing party to a relying party is in the form of an assertion, and this assertion may contain different types of information in the form of statements. For example, an assertion may be a statement about the authenticated identity of a user, or it may be a statement about user attribute information that is associated with a particular user.

FIG. 1A is an overall block diagram of a federated operating rules-based system 100 that provides physical and logical access to multiple users 101 across multiple members. A user 101 may employ user access system 105, which may include, for example, a smart card and a PC or workstation, to access protected resources in the system 100. The system 100 includes credential issuer 200, relying party 300, and FiXs network 400. Although the system 100 is shown with a single credential issuer 200 and a single relying party 300, the system 100, in actuality, includes numerous credential issuers and, similarly, numerous relying parties.

The credential issuer 200 validates identities of individual users, issues identity cards, and related access devices (tokens) to or on behalf of the users, and maintains user records. The credential issuer 200 also processes authentication requests from the relying party 300 and provides responses to the relying party 300 based on validation of individual user credentials.

The relying party 300 operates authentication stations at facilities that require identity validation for entry. The authentication stations may allow physical or logical entry.

The FiXs network 400 routes authentication requests from relying parties to credential issuers, and transmits the corresponding responses.

The credential issuer 200 includes a credential issuer system 202 that processes authentication requests from the relying party 300 and provides responses based on validation of user credentials. The credential issuer system 202 supports enrollment of the FiXs member users; maintenance of reliable connectivity for data access, storage of member data (e.g., in database 204), log and audit trails; and credential authentication. The credential issuer system 202 will be described later with reference to FIG. 2. Each credential issuer 200 may include one or more facilities 206. The facilities 206 may be physical or logical facilities.

The relying party 300 includes relying party system 302 that is used to initiate authentication requests of users who present credentials at authentication stations and allows or denies access based on the responses, and database 304 that stores user-related data, for example. Each relying party 300 may include one or more facilities 306. The facilities 306 may be physical or logical facilities. Within each of the facilities, the relying party 300 may include one or more protected resources 301. The relying party system 302 will be described in more detail with reference to FIG. 3.

In operation, the relying party 300 may act as a credential issuer to another relying party. Similarly, the credential issuer 200 may act as a relying party to another credential issuer. That is, in the FiXs network 400, the relying party 300 and the credential issuer 200 may assume similar roles with regard to access to each other's protected resources.

The FiXs network 400 includes a governance board 402, which establishes and administers participation by FiXs members, operating rules to guide the FiXs members, and FiXs network governance. The FiXs network 400 also includes an operating entity 406 that operates the FiXs network 400, ensures adherence to technical specification of the various FiXs members, and provides authentication transaction routing. The FiXs network 400 will be described in more detail with reference to FIG. 4A.

In the federated operating rules-based system 100, the domain at which the user 101 authenticates may be termed the user's (authentication) home domain. The home domain maintains authentication credentials (i.e., the credential issuer 200). The home domain may be the user's employer, the user's ISP, or some other service provider. There may be multiple enterprises within a federated environment that could act as a user's home domain because there may be multiple enterprises that have the ability to generate and validate a user's authentication credentials.

Figure 1B:
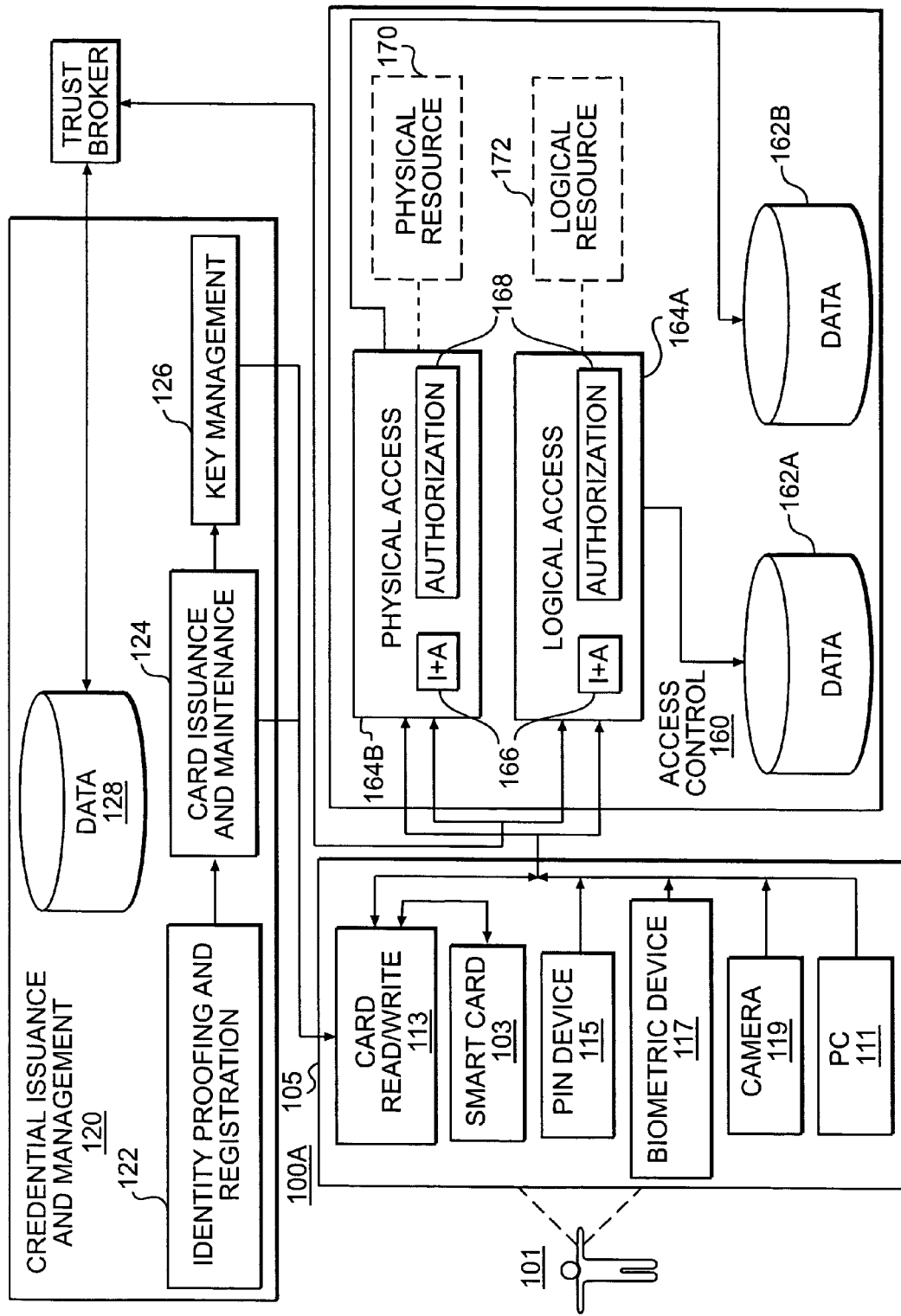

FIG. 1B is an overall architectural diagram of various components of a user identification verification system that operates among the various components of the system 100 shown in FIG. 1A. A federated architecture 100A includes components and processes that support a common platform for identity verification across divergent enterprises that agree to cooperate in a federated authentication scheme. One embodiment of the common platform involves smart card-based writing and reading means. These smart card-based means allow for the issuance of smart card credentials according to an agreed to standard, reading of smart cards according to agreed to procedures, and authorization to access protected resources based on identity verification made possible by the smart card-based writing and reading means.

The architecture 100A includes smart card issuance and management system 120, which contains the means for identity proofing and registration, credential issuance and management, and the various repositories and services (e.g., public key infrastructure (PKI) directory, certificate status servers) required as part of the identity verification infrastructure. Compared to FIG. 1A, the system 120 would be invoked at the credential issuer 200.

The credential issuer 200 uses the smart card issuance and management system 120 to collect, store, and maintain information and documentation that is required for verifying and assuring each user's identity. An identity proofing and registration module 122 is used for user information collection and storage. A card issuance and maintenance module 124 is used for the personalization of the physical (i.e., the appearance of) smart card 103 and also the logical, or data, aspects of the smart card 103. Such personalization includes printing photo images, emplacing names of the user and the user's organization on the smart card 103, and loading user-specific data, such as biometric data and a PIN, for example, onto the smart card 103.

A key management module 126 is used to generate key pairs, issue and distribute digital certificates containing the public key of the smart card user 101, and for management and dissemination of certificate status information. The key management module 126 provisions data repository 128 with PKI credential data and information. The data repository 128 may be accessed when relying parties 300 attempt to determine whether or not a specific user 101 is to be granted access to protected resources.

User access system 105 includes the smart card 103, card reader 113, PIN input device 115, biometric reader 117, and camera system 119, and PC/workstation 111. These various devices can be used in combination to authorize physical and logical access by the user 101 to protected resources of the relying party 300. As such, these user access system components will be invoked at each relying party 300 in the system 100. Components of the user access system 105 also may be used during the smart card issuance process.

The smart card 103 is described later in more detail. The smart card 103 is used in conjunction with the smart card reader 113, which may be located at each physical and logical access point within the relying party 300. The smart card reader 113 will be described later in more detail. In operation, the user 101 uses the smart card 103 for authentication to access various physical and logical protected resources. The smart card 103 communicates with the smart card reader 113 to provide certain identity information, located, for example, in a memory of the smart card 103, which information is in turn relayed to access control system 160 for granting or denying access.

When invoked at the protected resource access points, the PIN input device 115, biometric reader 117, and camera system 119 provide additional layers of security for controlling access to the protected resources. For example, the smart card 103 may contain biometric data (e.g., fingerprints) of the user 101. The biometric reader 117, which may be co-located with the smart card reader 113, may be used to obtain the user's fingerprints for comparison to the fingerprint data stored on the smart card 103, or at the credential issuer's database 204 (see FIG. 1A). As another example, the PIN input device 115, which also may be located at each physical and logical access point, is used by the user 101 to enter the user's PIN. The same PIN can be stored on the smart card 103. For physical access, the user 101 may enter the PIN using a PIN pad device. For logical access, the user enters the PIN using, for example, a keyboard.

Access control system 160 includes the physical and logical access control systems, such as the FiXs domain servers and data repositories at the credential issuers 200 and the relying parties 300, that control access to the protected resources of the relying parties 300. The access control system 160, in conjunction with the user access system 105, provides a consistent and secure means for identity verification and authorization to access protected resources.

The access control system 160 includes components used for determining if a specific user 101, based in part on the user's smart card 103, will be granted access to one or more protected physical or logical resources 170/172. A physical resource is a secured facility (for example, a building, room, or area) that the user 101 wishes to access. A logical resource includes a network or network location (for example, a server, workstation, database, folder, or file) that the user 101 wishes to access.

An authorization database (comprising logical authorization database 162A and physical authorization database 162B) includes information that defines the privileges to be accorded specific users 101 who may request access to a particular physical or logical resource. For example, logical authorization database 162A may include an access control list that identifies each user in the federated network 100 who may be granted access to a file residing on a relying party's internal network. Although in FIG. 1B the authorization databases are represented as single databases, as implemented in the federated network 100, the authorization databases may comprise many databases, and these databases may be scattered among many different relying parties 300. In an embodiment, each relying party 300 will have its own authorization databases, and the combination of these authorization databases comprises the authorization databases.

Logical and physical access control systems 164A and 164B operate in conjunction with the user access system components to grant or deny the user 101 access to specific protected physical and logical resources, respectively. The access control systems include identification and authentication (IA) module 166 and authorization module 168. The IA module 166 interacts with the smart card reader 113 and other components of the front end system 105, and uses mechanisms, described below in detail, to identify and authenticate (i.e., authorize) users 101. Once the user 101 is identified, the authorization module 168 interacts with the authorization databases to match user-provided information to information on record.

FIGS. 1C and 1D illustrate one embodiment of a smart card 103 that may be used in the system 100. Referring to FIG. 1C, the front 103A of the smart card 103 includes a user image section 181, which may contain a color photograph of the user 101, with a certain minimum resolution (i.e., dpi). An enterprise section 183 identifies the FiXs member that issued the smart card 103, and may include information such as expiration date and the FiXs member's logo, including a holographic logo, for example. A user name section 184 includes the user's full name, and may include title and rank, if applicable. An optional signature panel 185 contains the user's signature. The signature may be an actual signature or a digital rendition of the user's actual signature. An optional enhanced bar code (EBC) 10 may contain additional data that is used to authenticate the smart card and to verify the user. The use of an EBC will be described later. All text and numbers entered on the smart card 103 may be in machine-readable format.

As shown in FIG. 1D, the back 103B of the smart card 103 includes optional barcode 197. The barcode 197 may encode a unique user serial number and a credential issuer identification.

The smart card 103 includes a chip/memory section 191, which in turn includes the programming and data (the logical credentials) needed to authenticate the smart card 103, and assist in identifying the user 101 and accessing protected resources. The chip/memory section 191 may contain a Card Holder Unique Identifier (CHUID) that may be used to provide uniform access procedures at a wide spectrum of enterprises within the FiXs network 400. The CHUID is described in detail in, for example, Technical Implementation Guidance: Smart Card Enabled Physical Access Control Systems, Ver. 2.2, which is hereby incorporated by reference. When implemented on the smart card 103, the CHUID is tied to the user's biometric data to uniquely identify the user 101. More specifically, the CHUID provides a unique member, which is assigned to only one user 101 in the FiXs network 400. Table 1 is an example of data elements that may comprise a CHUID. Finally, the smart card 103 includes a card reader interface module 193, which may work with both contact and contactless card readers.

TABLE 1

CHUID Data Elements
(Card Holder Unique Identifier) CHUID File/Buffer

| Data Element | Tag | Type | Max Bytes |
| --- | --- | --- | --- |
| Buffer Length | EE | Fixed | 2 |
| User ID | 30 | Fixed | 25 |
| Agency Code | 31 | Fixed | 4 |
| Organization Identifier | 32 | Fixed | 4 |
| Data Universal Numbering System | 33 | Fixed | 9 |
| Global ID | 34 | Fixed | 16 |
| Reserved | 35-3C | | |
| Authentication Key Map | 3D | Variable | |
| Asymmetric signature | 3E | Variable | |
| Error Detection Code | FE | LRC | 1 |

Logical credentials include elements (e.g., a user's unique PIN) that match the identity of the user to the user's smart card 103. The PIN may be used to unlock the smart card 103 and to then supply other embedded credentials for authentication purposes. The logical credentials also include elements (e.g., card management keys) that match the identity of the smart card management system to the smart card 103, and elements (e.g., biometric data, asymmetric keys) to prove the identity of the user 101 to the relying party's access control system 164A/164B.

Figure 1E:
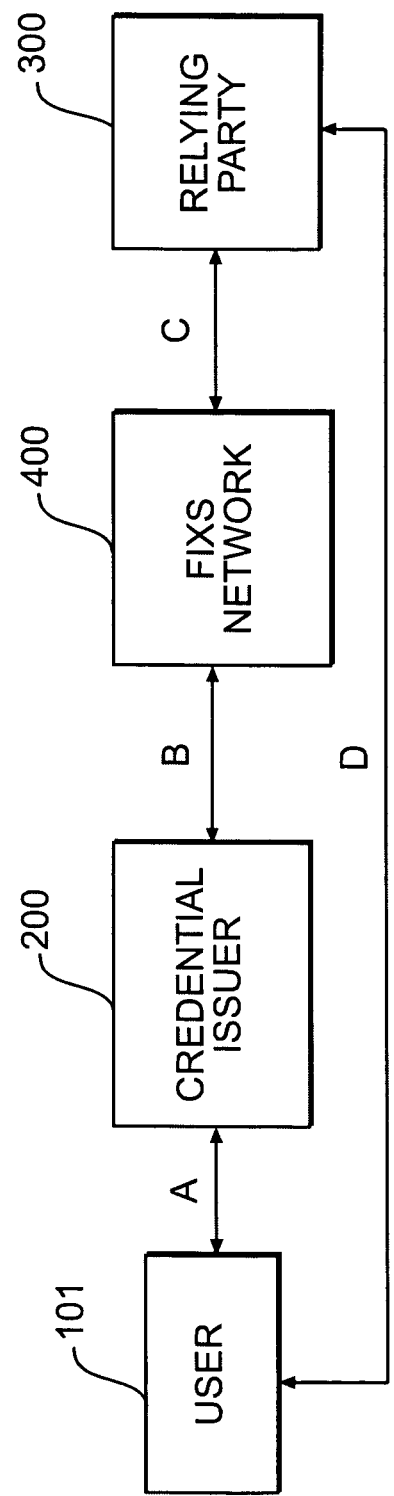

FIG. 1E is a block diagram that shows the basic transactions that may be initiated by a user 101 to a federated enterprise, which, in response, may invoke actions at other enterprises within the federated environment. As can be seen, the federated operating rules-based system 100 supports the transitivity of trust and the transitivity of the authentication assertion process; an enterprise can issue an assertion based on its trust in an identity as asserted by another enterprise. As shown in path D, user 101 initiates a transaction through an access request for a protected resource at relying party 300. The user 101 may physically be at the relying party 300 for both logical and physical access, or may be remote from the relying party 300 for logical access. The user 101 has been enrolled (path A) by credential issuer 200, which is the user's home domain. The transaction (path D) requires some type of authentication operation by the relying party 300, which transmits (path C) an authorization request to the FiXs network 400, which forwards (path B) the authorization request to the credential issuer 200. In response, credential issuer 200 provides an authorization response (path B, then C) to relying party 300. An individual at the relying party 300 may then grant the user 101 access to the relying party's protected resources. Alternatively, an electronic device, such as a PC or workstation may be used to allow access following a satisfactory authorization transaction.

Figure 1F:
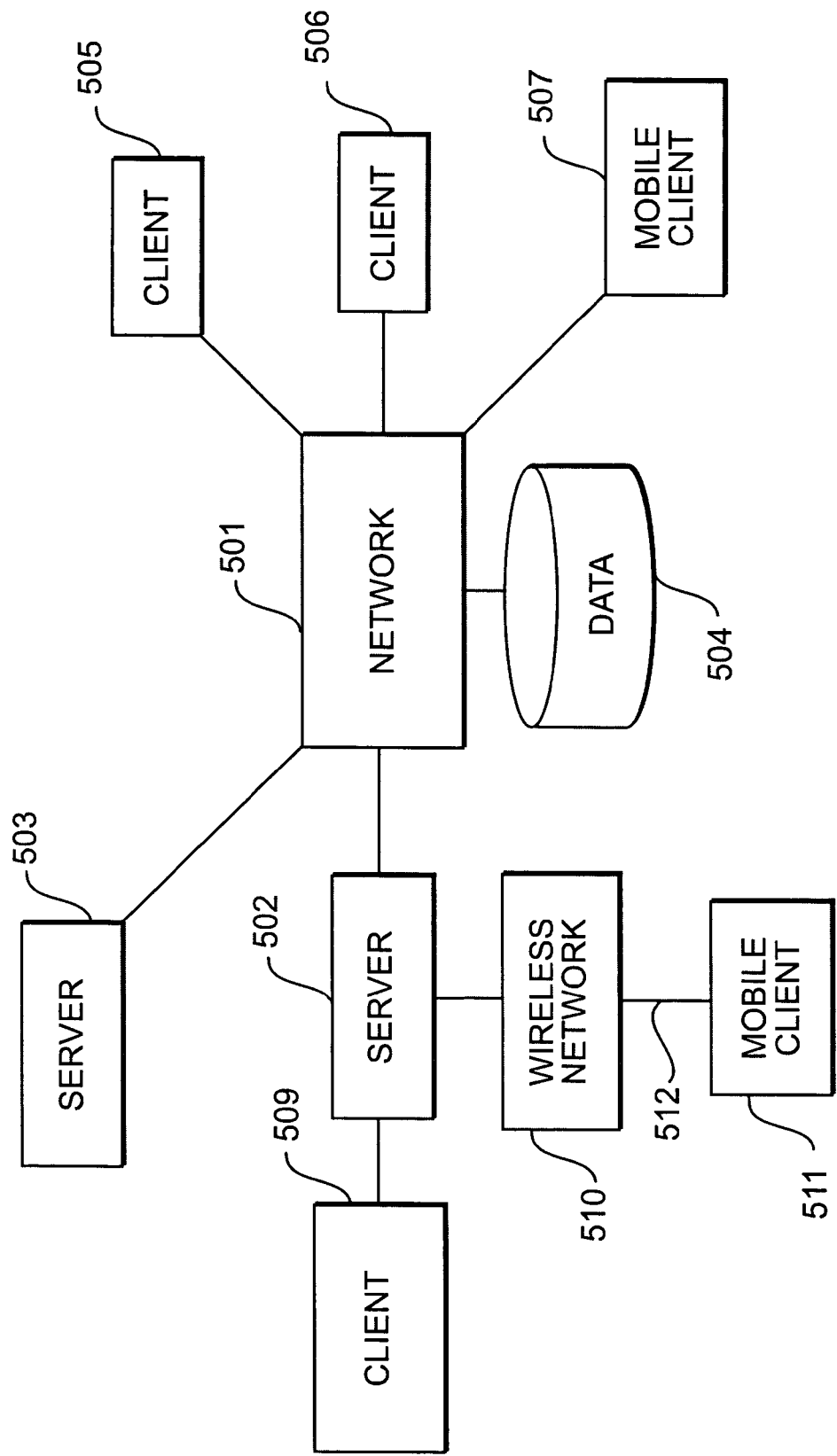

FIG. 1F shows a typical network of data processing systems, each of which may implement the federated operating rules-based system 100. Distributed data processing system 500 contains network 501, which is a medium that may be used to provide communications links between various devices and computers connected together within the system 500. The network 501 may include permanent connections, such as wire or fiber optic cables, or temporary connections made through telephone or wireless communications. In the example shown, server 502 and server 503 are connected to network 501 along with storage unit 504. In addition, clients 505-507 also are connected to network 501. Clients 505-507 and servers 502-503 may be represented by a variety of computing devices, such as mainframes, personal computers, and personal digital assistants (PDAs), for example. The system 500 may include additional servers, clients, routers, other devices, and peer-to-peer architectures that are not shown.

The system 500 may include the Internet with network 501 representing a collection of networks and gateways that use various protocols to communicate with one another, such as LDAP (Lightweight Directory Access Protocol), TCP/IP (Transport Control Protocol/Internet Protocol), and HTTP (HyperText Transport Protocol). The system 500 may also include a number of different types of networks, such as, for example, an intranet, a local area network (LAN), or a wide area network (WAN). For example, the server 502 directly supports client 509 and network 510, which incorporates wireless communication links. Network-enabled mobile client 511 connects to network 500 through wireless link 512. The client 511 can directly transfer data across wireless link 512 using an appropriate technology, such as Bluetooth™ wireless technology, to create personal area networks or personal ad-hoc networks.

Another aspect of the trust relationship inherent in the federated operating rules-based system 100 of FIG. 1A is the need to properly investigate each applicant before enrollment into the FiXs system and issuance of an authentication credential (e.g., a smart card). Verifying the applicant's identification is the process by which the member organization validates the identity information provided by the applicant. This process is completed for each FiXs applicant regardless of whether the same or similar documentation has been verified as part of the organizations regular enrollment process. This step may require background checks or background investigations. In addition, the would-be user may be subject to periodic review and revalidation, such as by performing a background investigation for the participant every five years. Participating member organizations may specify minimum validation requirements for access to that organization's resources. Each member organization is made aware of the requirements of the various relying parties, and certifies compliance with those requirements as part of the enrollment process.

Figure 1G:
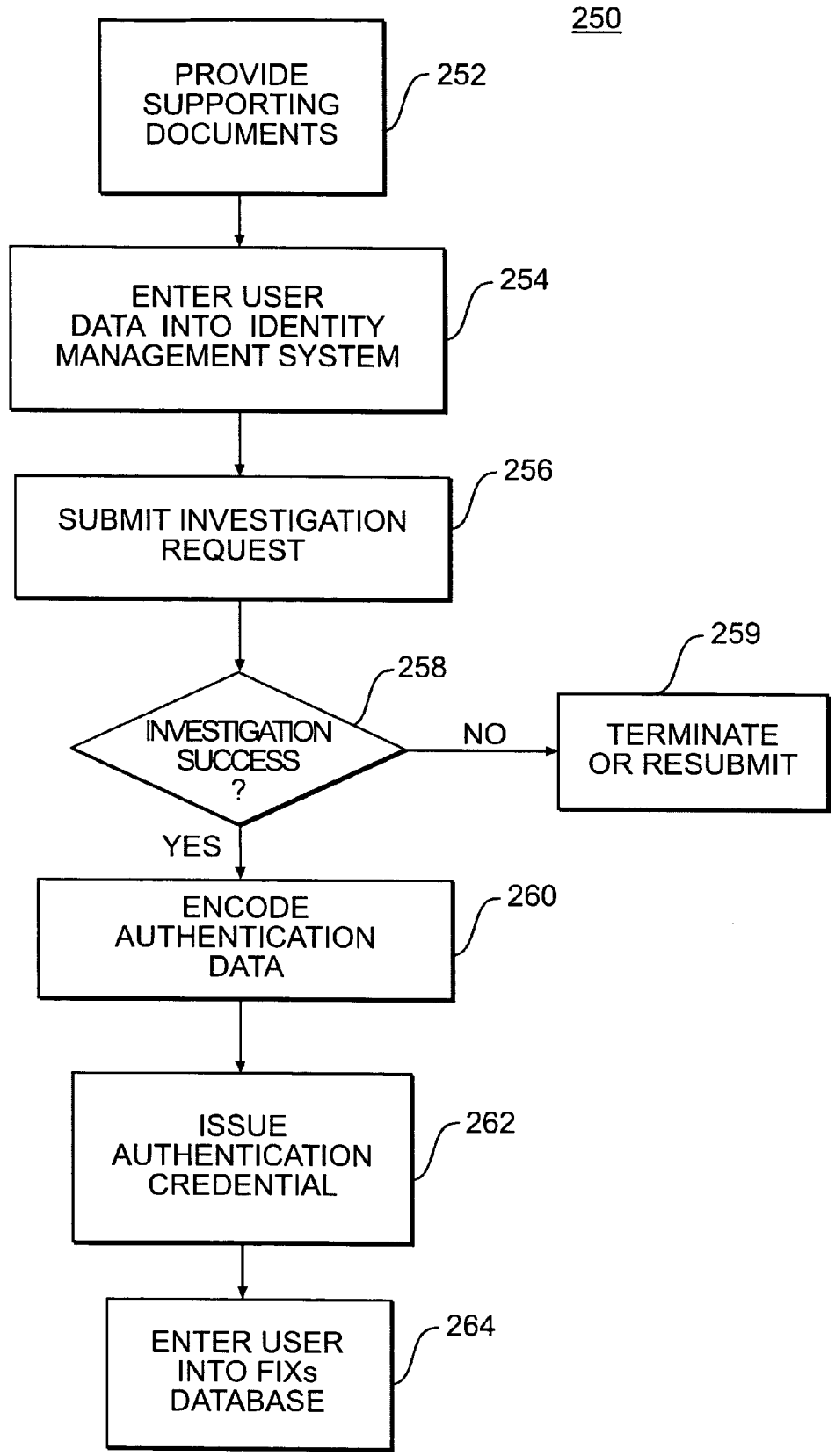

FIG. 1G illustrates an embodiment of an applicant identity verification and credential issuance process 250 executed, in an embodiment, by the smart card issuance and management system 120 of FIG. 1B. The process 250 supports the system 100 in which each credential issuer 200 in the FiXs system 100 is responsible for enrollment of applicants and issuance of authentication credentials.

In block 252, an applicant provides supporting identity source documents (e.g., social security card, birth certificate) to enrollment personnel at the credential issuer 200. The identity source documents are intended to prove the identity of the applicant. In block 254, the enrollment personnel enter data from the identity source documents into the credential issuer's identity management system, thereby creating an FiXs application file for the applicant. The enrollment personnel also initiate a chain of trust for identity proofing so that, when the authentication credential (e.g., a smart card) is issued, the person applying (i.e., the applicant) is the same person who receives the authentication credential. In block 256, the enrollment personnel submit an investigation request for the applicant to an appropriate investigating body. For example, the enrollment personnel may request a national agency check or a special background investigation, depending on the level of access intended for the applicant.

In block 258, the enrollment personnel receive the results of the investigation, and if the investigation shows the applicant can receive the authentication credential, the process 250 moves to block 260, where authentication information is encoded into the authentication credential. In block 262, the applicant is issued the authentication credential, and the authentication credential is activated. In block 264, the user 101 is entered into the credential issuer's FiXs database 204.

Figure 1H:
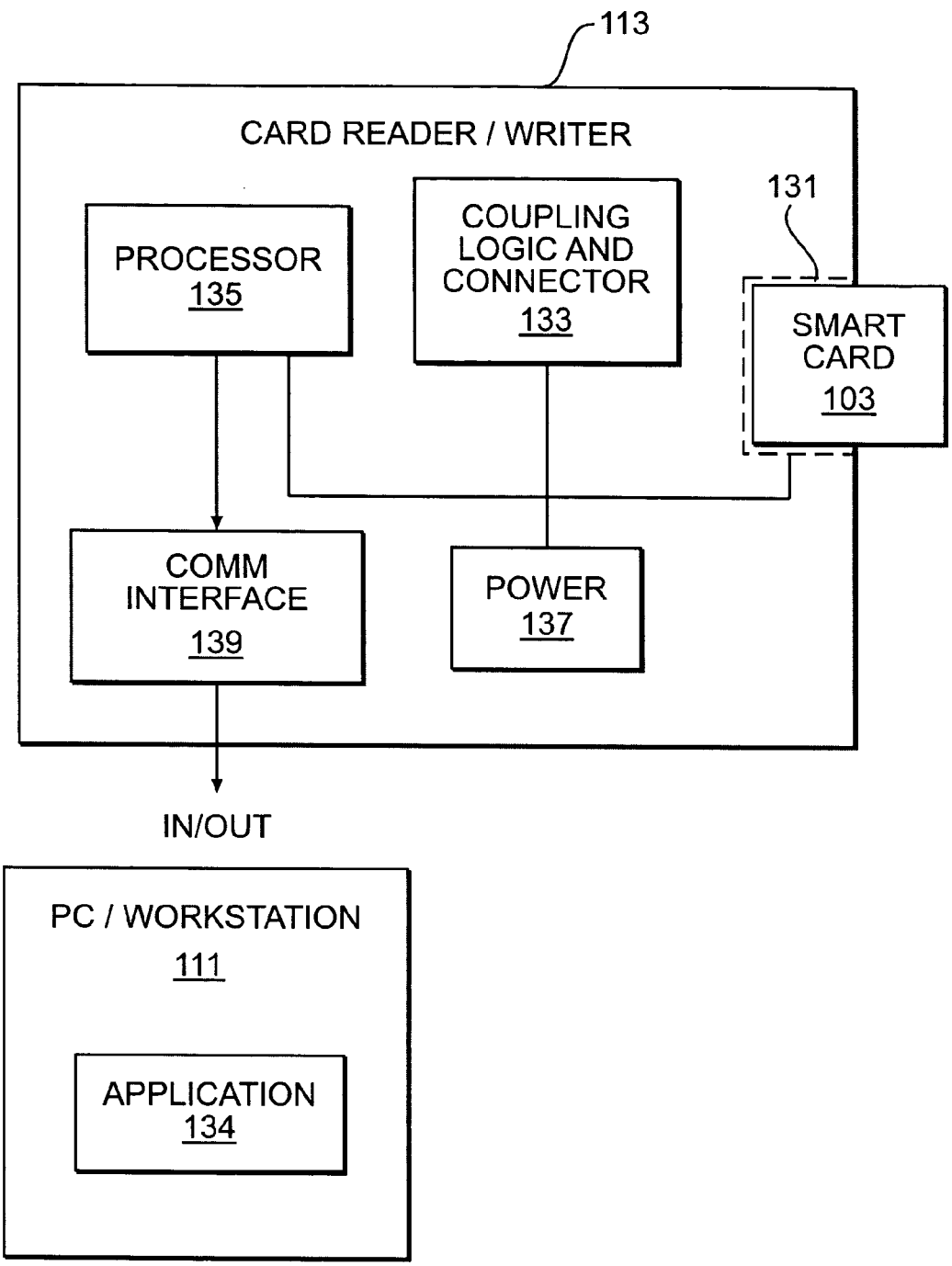
Figure 1I:
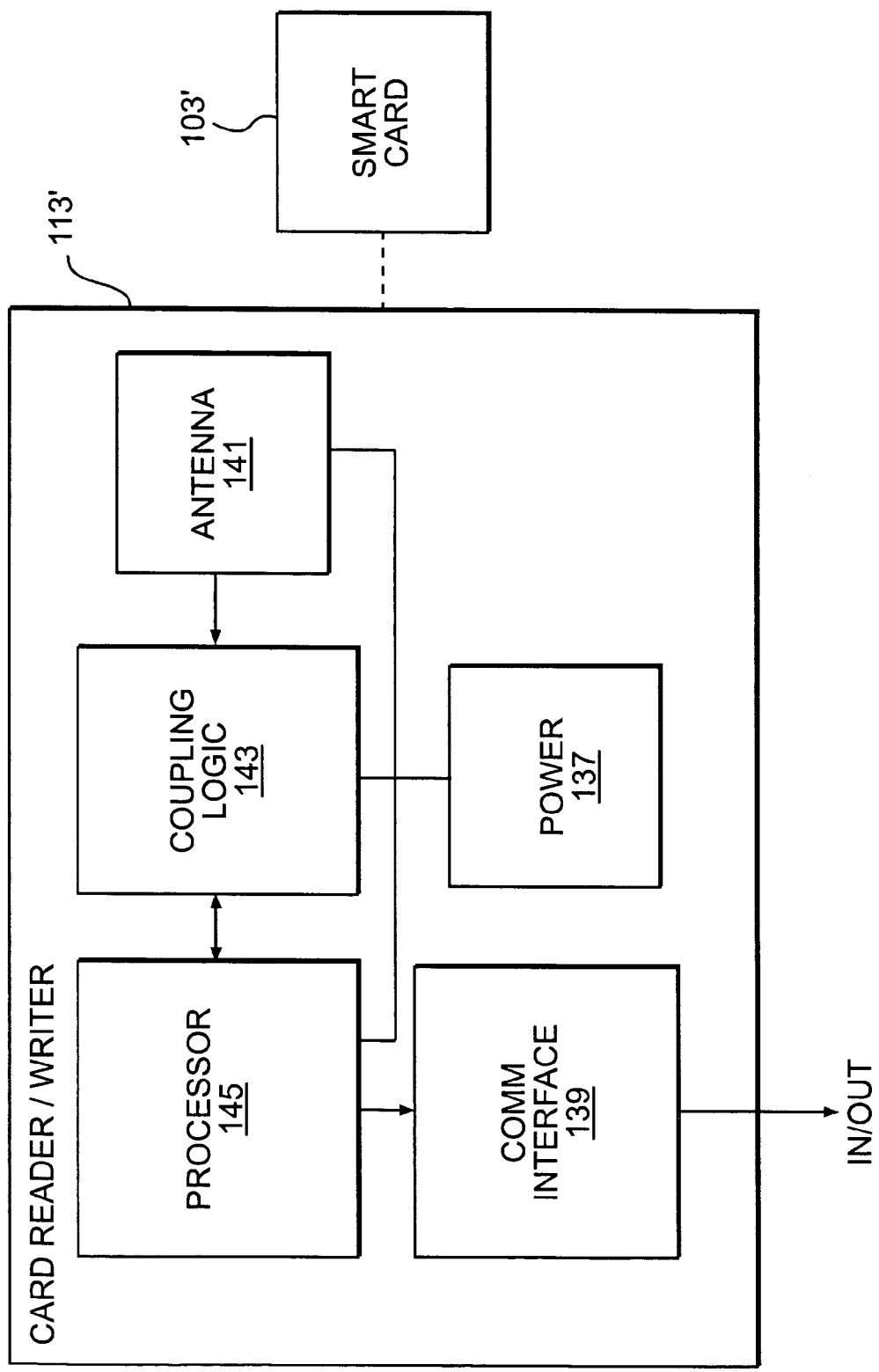

FIG. 1H is a block diagram of one embodiment of a smart card reader used in the system 100 of FIG. 1A. Smart card reader/writer 113 includes recess 131 into which the smart card 103 is inserted. In this embodiment, the smart card 103 is a contact smart card. The smart card reader/writer 113 can read information from the smart card 103 and can write information to the smart card 103. The recess 131 includes contact points (not shown) that engage corresponding contact points on the smart card 103. In a card reading mode, coupling logic and connector 133 includes the data transfer mechanisms and software to receive information from the smart card 103 and to transfer the received information to processor 135. In a card writing mode, a reverse process occurs. Power supply 137 provides power to the components of the smart card reader/writer 113. Finally, communications interface 139 operates to transfer information to and from the processor 135 from or to components external to the smart card reader writer 113. Components external to the smart card reader/writer 113 include a PC or workstation 111, for example, that operates in conjunction with the smart card reader/writer 113 as part of the system 105 (see FIG. 1B) for granting access to physical and logical protected resources and for enrolling applicants into the federated operating rules-based system 100.

FIG. 11 is a block diagram of an alternative smart card reader/writer 113' that interacts with contactless smart card 103'. The smart card reader/writer 113' differs from the device shown in FIG. 1H in that the smart card reader/writer 113' is coupled to the smart card 103' by means of antenna 141, thereby removing the need to insert the smart card 103' into a card recess. As such, the smart card reader/writer 113' may be implemented as a standalone device, or may be incorporated into another device, such as PC or workstation 111. When so incorporated, the coupling logic 143 and processor 145 functions may be included in other software and hardware of the PC or workstation 111.

The smart card reader/writer 113 and 113' also are capable of being implemented in a wireless fashion wherein the interface 139 incorporates wireless technology, such as Bluetooth™, to transfer data to and from a device that is not physically connected to the smart card reader/writer 113/113'.

In operation, the smart card reader/writer 113, upon receiving smart card 103, detects that the smart card 103 has been inserted, and the processor 135 generates an activation code that is sent to the attached PC or workstation 111. When received at the PC or workstation, the activation code initiates application program 134 that allows for data reading and writing functions. The application program 134 may first require entry of the user's PIN before the smart card 103 is activated and any data are read from or written to the smart card 103. PIN entry may be made by way of a separate but connected PIN pad, such as PIN input device 115 (see FIG. 1B), or by way of a keyboard attached to the PC or workstation 111, for example. Entry of a PIN that matches the PIN stored on the smart card 103 unlocks the smart card 103 to allow data transfer.

For many protected resource access operations, the physical smart card 103 shown in FIGS. 1C and 1D provides secure and efficient access processing. However, situations may arise wherein using the smart card 103 is inconvenient or impossible. Such a situation may occur, for example, when user 101 is physically located outside the confines of the relying party 300 yet requires access to logical protected resources of the relying party 300. An alternative embodiment for protected resource access in this situation involves the use of a virtual smart card wherein the information stored on the user's smart card 103 is replicated, for example, as an application stored in memory on the user's PC, or, alternatively, stored on the FDS 214, and recalled from memory as part of an authorization response when the user 101 requests access to the relying party's protected resource.

Figure 1J:
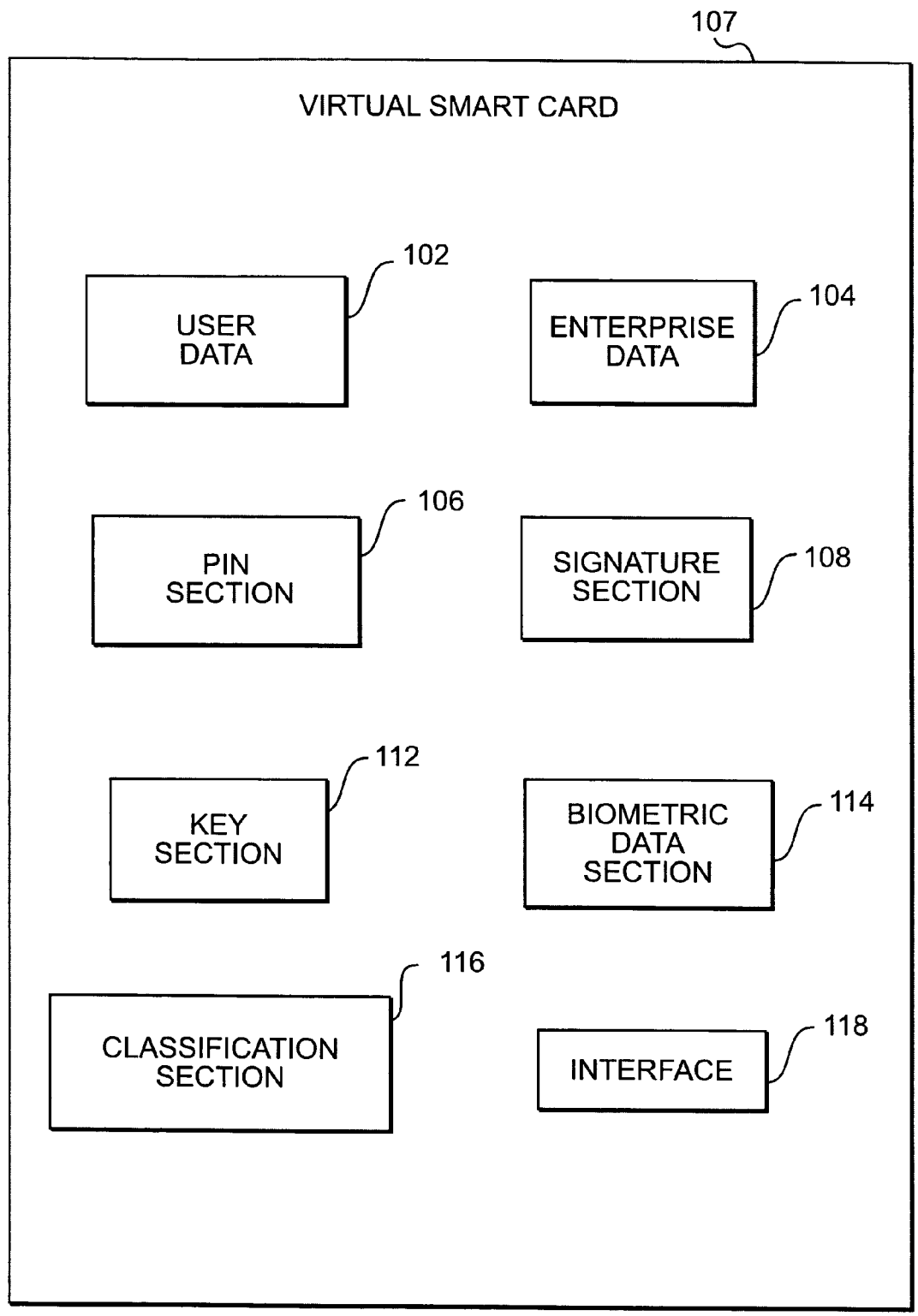

FIG. 1J illustrates an embodiment of a virtual smart card and associated components operable in the federated operating rules-based system 100 of FIG. 1A. Virtual smart card 107 includes user data section 102, wherein the user's photo image, name, position within the enterprise, and other identifying data are stored; enterprise data section 104, wherein the user's enterprise data are stored; user PIN section 106; user signature section 108, wherein the user's digital signature is stored; key section 112, which includes the user's private key; biometric section 114 that stores the user's biometric data (e.g., fingerprints); and classification section 116, that stores the user's authorized access levels and programs.

The virtual smart card 107 thus replicates all the data installed on smart card 103. The virtual smart card 107 also includes an interface 118 to application programs that may reside alternatively on the user's PC, the authentication client 225 or on the FDS 214 (see FIG. 2). The interface 118 allows authentication and verification programs to read data from the virtual smart card 107 and to write to the virtual smart card 107. The virtual smart card 107 may incorporate the Card Holder Unique Identifier described with respect to smart card 103 and FIG. 1C.

An application connecting to the virtual smart card 107 can access the following functions through the virtual smart card interface 118: Get card information (returns information on card origin); Initialize PIN, (set Personal Identification Number, password); Change PIN; Verify PIN; Select file (selects file to work with); Read file; Update file; Initialize session (initializes a session to the card 107); Allocate key object (allocates space for a key object); Free key object (frees space for a key object); Read key information; Update key information; Import key (import private key or public key); Generate signature (sign data); Verify signature (verify signature of data); and Generate key pair (create keys inside the card 107).

The virtual smart card interface 118 is a software module that facilitates interrogation of the virtual smart card 107. The interface 118 checks the identity and authenticity of the virtual smart card 107 to ensure the virtual smart card 107 was created by an authorized enterprise and has not been since modified. The interface 118 may receive a digital signature, which the interface 118 tests on establishing the communication with the virtual smart card 107.

The user's smart card 103 may include a barcode that is read by a smart card reader, or alternatively, by a separate barcode reader. The barcode may be a one- or a two-dimensional barcode, and the corresponding barcode reader or smart card reader would then be configured to read the barcode. Alternatively, the barcode may be an enhanced barcode (i.e., a graphical barcode). Such an enhanced barcode differs from a conventional two-dimensional barcode in several important respects. Perhaps most significant, the enhanced barcode can convey much more information that a standard barcode, yet can be rendered using currently available techniques. The enhanced barcode (EBC) can, for example, include a pattern that is digitized, and can take the form of a FiXs member's logo or name, for example. The EBC can also be a separated digitized pattern that overlays a conventional barcode.

The EBC may be used with respect to the smart card 103 in a number of ways, but is especially useful for encoding digital signatures—public key cryptography, which is a security element particularly useful for access to protected logical resources. More specifically, authorization requests that traverse networks such as the Internet must have enough security measures in place to ensure the request is not compromised, or initiated by a person intent on hacking into the protected logical resource.

In public key cryptography, two different keys, namely, a public key and a private key are used to encode messages. With knowledge of the public key, a user may encrypt a message, but without knowledge of the private key, another user cannot decrypt the same message. In a transaction, the originator of the message and recipient agree on a particular public key cryptography system to use, such as the widely used Rivest, Shamir, and Adleman (RSA). Then the recipient sends the originator his public key with which the originator encrypts the message. Next, the encrypted message is sent over the network to the recipient who uses his private key to decrypt the message.

Another security mechanism is a digital signature, which authenticates or verifies that a message sent could have only originated from the message originator. The originator forms a digital signature by passing the data to be signed (e.g., a computer file) through a one-way hash function and then encrypting the resulting hash value using the private key of the originator. The originator then sends the data, the public key of the originator, and the digital signature to the recipient. The recipient passes the received data through the same one-way hash function obtaining a hash value. The recipient then decrypts the digital signature with the public key of the originator and recovers the hash value. If the recovered hash value matches the hash value the recipient generated, the signature is valid. Although this and other public key digital signature protocols guarantee a level of authenticity and security for the digital signature, these protocols do not have a mechanism for binding the purpose of a digital signature along with the signature so that the signature is not used for an improper purpose.

In addition, while the digital signature mechanism works well in many contexts to ensure security of data and transactions, the actual digital signature is only useful in the electronic universe. To humans the digital signature is unrecognizable, and cannot be interpreted. However, embedding a signature as a foreground graphic image in a barcode allows the signature to perform its customary, electronic universe function, and at the same time provides a human-readable display. By supplementing the digital signature decoding process with a human-readable form of a signature, security of the access authorization request and response can be enhanced.

An EBC also can use a modulated base image with a graphical encoding of information to produce the barcode. Besides encoding a digital signature and an actual signature, the EBC may encode, as the base image, any graphical pattern, including a logo (e.g., an enterprise logo), graphics, pictures, text, images, or any pattern that is easily recognizable by a human. The information may be embedded in the graphical design of text, pictures, images, borders, or the background of base image to produce the EBC. The information may be embedded in the EBC in the form of a binary image (e.g., a black and white dot pattern), a multilevel image (e.g., a gray-level image), or a multilevel color image.

The embedded information may relate to the smart card 103, the user 101, or the credential issuer 200. For example, the two-dimensional barcode may include information that identifies the smart card 103, such as a code, or other index mechanism, the credential issuer that issued the smart card 103, date of issuance and expiration, and other information. The barcode also can be used to embed a variety of data, such as a signature, an identification code, a universal resource locator (URL) code, encrypted or unencrypted data, and a logo and other graphics. The EBC, in an embodiment, provides the advantage of providing human-readable data. In the example of a signature, a human may read and recognize the signature as a human signature. In another example, the EBC may also include data that can be used to identify a possible forging of the smart card 103.

The EBC can be used to speed the authentication process. For example, the EBC can include a URL or other FiXs address of the credential issuer, so that when the EBC is scanned, the credential issuer is automatically contacted for the purposes of sending an authorization request.

Use of the EBC involves two basic functions: encoding and decoding. The encoding function uses an encoding algorithm to generate the barcode and places the thus-generated barcode on the smart card 103. Decoding involves machine-reading the barcode using a decoding algorithm. The decoding algorithm can operate with or without an original bit map that was used to generate the barcode. In addition, the barcode may be enhanced in a manner that makes at least a portion of the encoded information within the barcode readable by a human.

The EBC can be encoded with a black and white graphic embedded into a gray/white background (using a gray color for bit 1 and white for bit 0, for example). The EBC can also be encoded using a color background to improve visual quality or to increase data density. In general, use of the gray/white background, or use of the color background, allows the graphic (i.e., the foreground) to stand out visually from the background (i.e., the barcode). The encoding process may also add reference marks to the embedded graphic. The reference marks are then used in the decoding process to account for possible misalignment of the EBC while decoding. Examples of the reference marks include embedded graphical information located at a top part of the EBC that can be decoded before starting the decoding process for the embedded graphic, dot patterns located around edges of the embedded graphic, and random spatial scattering of information in the background.

One method for decoding the EBC assumes an original graphic bit map is available. The original graphic bit map is then used as an anchor to locate and synchronize an embedded bit-stream (e.g., a signature) for reliable data retrieval. More specifically, the graphic may be located, or overlaid, at a specific starting point of the barcode. The starting point may be determined by the encoding device, or may be specified as part of the data comprising the bit map. The bit map itself may be defined as a series or sequence of data points, each having a unique x-y relationship to the starting point. With the starting point and the x-y relationships known, the decoding device can read the bit map to separate the bit map from the background barcode. That is, the decoding device does not attempt to read any barcode data from the area defined by the bit map. To implement this method, the decoding may have access to the original bit map, either as part of the authorization response provided by the credential issuer or by accessing a database containing the original bit map.

A second decoding method does not require use of the original graphic bit map. Instead, a more elaborate mechanism is used to separate the embedded foreground data (i.e., the graphic) from the background data (i.e., the barcode). A color detection algorithm may be used to perform a first separation step, assigning black, gray or white to each pixel or block of pixels in an N×M matrix. Next, error correcting code is used to correct some or all detected errors in accordance with procedures that are well known in the art. Since bar code writers/readers may introduce noise into the EBC encoding/decoding process, some errors will occur around edges of the embedded graphic. The decoding process can use embedded reference marks to assure the embedded graphic is read correctly.

Figure 1K:
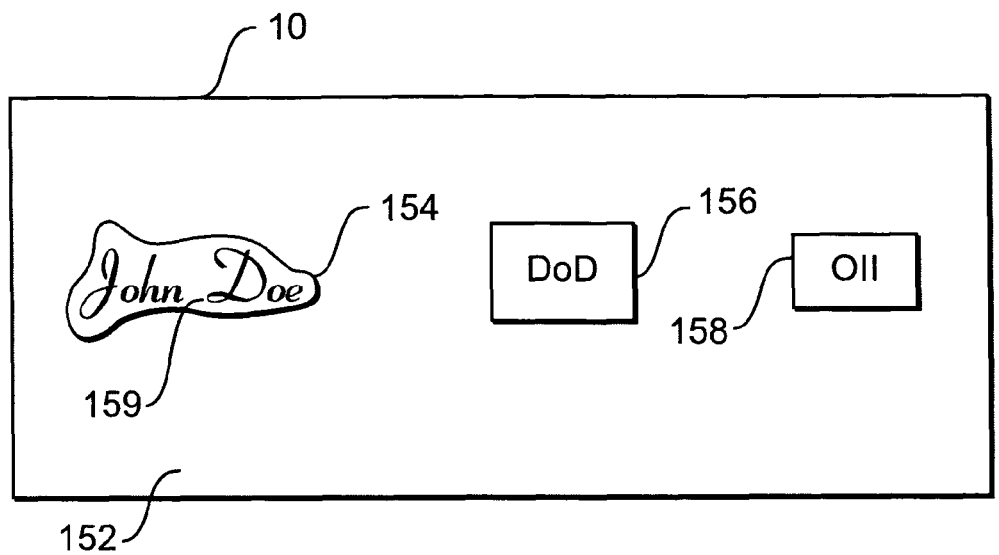

FIG. 1K illustrates an EBC 10 having a two dimensional barcode 152 with an overlaid graphic 154, and with optional overlaid logo 156 and information 158. Data comprising the EBC 10 may be contained in the database 204. The barcode reader and decoder 317 (see FIG. 3A) is used to scan and decode information contained within the barcode 152 and the graphic 154. In FIG. 1K, the graphic 154, which, for example, may be a signature, is superimposed over the barcode 152. Overlaying the signature 154 on the barcode 152 creates blackout regions 159, which may appear as errors if an attempt were made to read the barcode 152. That is, when the barcode 152 is scanned, the overlaid graphic 154 obscures parts of the barcode 152. This obscuring appears to the decoder 317 as an error, and error correction software may be required to recover information from the barcode 152.

Figure 1L:
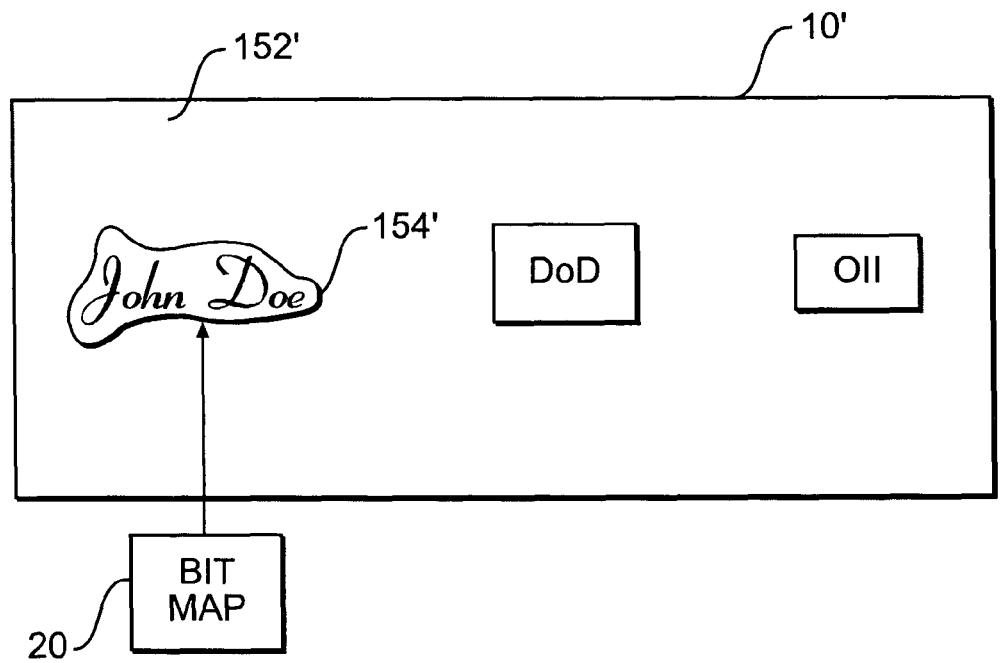

FIG. 1L illustrates an EBC 10' that combines a graphic with a two-dimensional barcode in order to recover as much information as possible from the barcode. In FIG. 1L, a graphic 154' is defined as a bit map 20, and the bits in the bit map 20 may be added, as digital data, to the data comprising a barcode 152'. For example, the database 304 may contain examples of signatures for a number of users 101. The signatures are stored in the database 304 as bit maps, and are identifiable by an identification number, or other means, for example. The decoder 317 when attempting to read the barcode 152' first identifies the graphic (e.g., a signature) 154' from a scan of the combined barcode 152' and graphic 154'. The decoder 317 then retrieves the bit map 20 corresponding to the graphic 154' from the database 304. The decoder 317 decodes the barcode 152', but does not attempt to read data in the areas defined by the retrieved bit map 20. By avoiding the areas defined by the bit map 20, the decoder 317 can reduce the number of detected errors in the read barcode, with the result that fewer data bits are required to be allocated to error correcting code (ECC).

Alternatively, software resident at the authentication client 305 (see FIG. 3A) may be used to compare a sample signature provided by the user 101 contemporaneously with an access attempt to the signature (graphic) provided by the smart card 103. To use this alternative method, the user 101 would first provide his signature using, for example, an electronic signature pad.

Figure 1M:
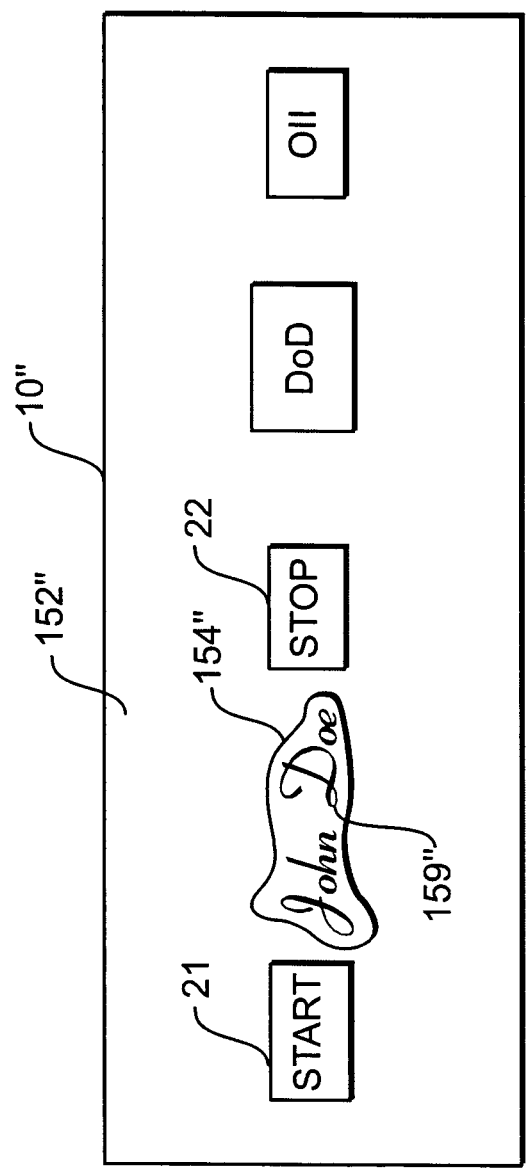

FIG. 1M illustrates another EBC 10" embodiment. In FIG. 1M, barcode 152" is overlaid with the graphic 154", thereby creating blackout regions 159" that may generate errors that ordinarily would require correction using an ECC, for example. However, the embodiment shown in FIG. 1M uses reference marks comprising start points 21 and stop points 22 that indicate where the graphic 154" is overlaid on the barcode 152". By reading the start points 21 and the stop points 22, the decoder 317 can stop data processing in the blackout regions 159". The start and stop points 21 and 22 may specify an x-coordinate and a y-coordinate.

In the embodiment shown in FIG. 1L, the decoder 317 must access the database 304 in order to retrieve the bit map 20. Information contained in the barcode 152' may indicate a location of the database 304, and the identification (location) of the bit map 20 within the database 304. In the embodiment shown in FIG. 1M, the decoder 317 need not have access to a separate data file defining the graphic. That is, the decoder 317 obtains the reference marks from the barcode 152.

In the federated operating rules-based system 100, the EBC 10 may be used to detect forgeries of smart cards 103. In the embodiment shown in FIG. 1L, for example, the overlaid graphic 154' may represent a signature or other uniquely identifiable graphic, and the barcode 152' may contain information related to the smart card 103, such as the issue date of the smart card 103. A would-be forger may attempt to replace the signature that is overlaid on the barcode 152' with another signature. Alternatively, the forgery may take the form of copying the barcode 152' and signature 154' onto another (fake) smart card. In the first alternative, replacement of the signature may lead to areas of the barcode 152' being obscured that would otherwise be readable by the decoder 317. In this case, the decoder 317 would use the bit map 20 to try to decode the barcode information, but the presence of the forged signature would cause the decoder 317 to detect additional errors, beyond an established threshold, for example. Such additional error detection can be used to indicate a forgery. In the second alternative, information encoded into the barcode 152' may be unique to the original smart card 103, but would not conform to information related to the forged smart card.

Figure 2:
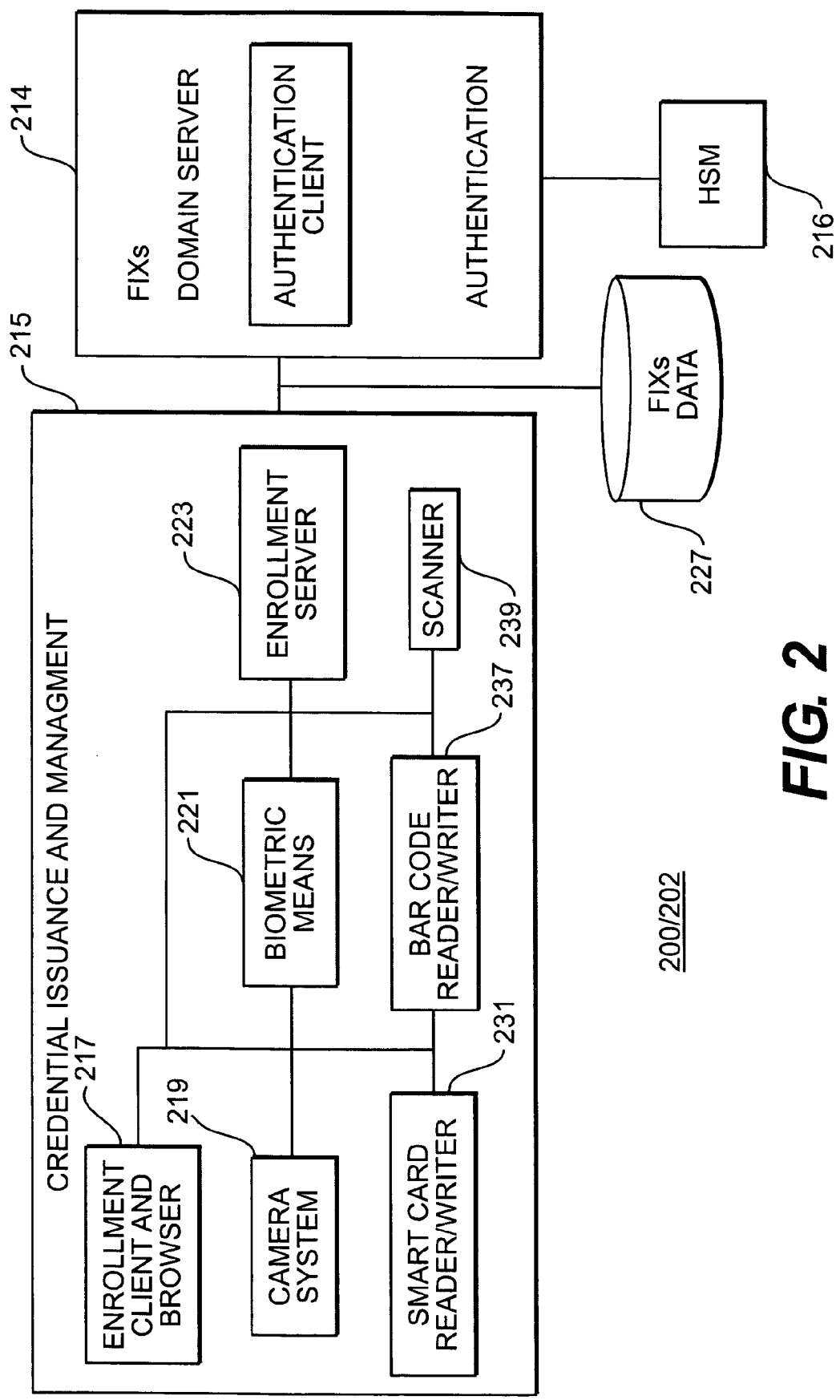
FIG. 2 is a block diagram of an embodiment of a credential issuer operating in the federated credentialing system.

FIG. 2 is a block diagram of the credential issuer 200 and system 202. The credential issuer 200 employs specific enrollment personnel who are certified to the FiXs network 400 as responsible for issuing appropriate authentication credentials to FiXs users 101. The credential issuer 200 designates, trains, and certifies each enrollment person.

As part of credential issuer system 202, the credential issuer 200 maintains a credential issuance and management system 215 that the credential issuer 200 uses to enroll applicants into the federated rules-based operating system 100. The system 215 is similar to the system 120 shown in FIG. 1B. The system 215 includes an enrollment client and browser 217, which may be implemented on a PC with a Web browser, for access to a FiXs Domain Server (FDS) 214. The enrollment client 217 includes specific hardware and devices and software such as a set of drivers for a camera system 219, which captures and stores digital images of each user 101 who may access resources on the FiXs network 400, and a biometric readout means 221, such as a fingerprint reader. An enrollment server 223, which may be a standard Web server (residing on the FDS), processes enrollments from an authentication client 225 and stores the records in FiXs data repository 227.

The system 215 may employ a smart card reader/writer 231 that can be used to write ID data to the card and record images for comparison to a scanned image on an authentication client. Captured data must conform to specifications found in FiXs technical specifications provided by the FiXs operating entity 406.

The system 215 includes biometric capturing means 233 and associated software. The biometric capturing means 233 captures unique biometric data for each user 101 who may access protected resources in the FiXs network 400. The biometric capturing means 233 may be a fingerprint capturing device that captures, reads, stores and compares fingerprint data. A retinal scan device may similarly capture, read, store and compare unique retinal data.

The system 215 further includes a barcode reader/printer 237 for reading and printing barcodes. The system 215 still further includes a scanning device 239 that is capable of scanning physical documents into electronic form for electronic storage of the documents.

Also part of the credential issuer system 202 are the FiXs Domain Server (FDS) 214 and authentication client 225. The FDS 214 contains interfaces to the FiXs data repository 227, a FiXs trust broker (see FIG. 4A), the enrollment client 217, and the authentication client 225. The FDS 214 communicates with a hardware security module (HSM) 216, which is used to encrypt messages being sent to the FiXs trust broker and to verify signatures of messages received from the FiXs trust broker. The HSM 216 contains a private key for the HSM 216 and the public key of the FiXs trust broker. The HSM 216 is loaded by the FiXs trust broker and is delivered securely to each FDS at each FiXs member.

The FiXs data repository 227 stores the identification credentials and audit files associated with the FiXs users of the member organization, and interfaces to the member's FDS.

The authentication client 225 includes the operating software and application programs to receive and decipher authorization requests and to formulate authorization responses.

Figure 3A:
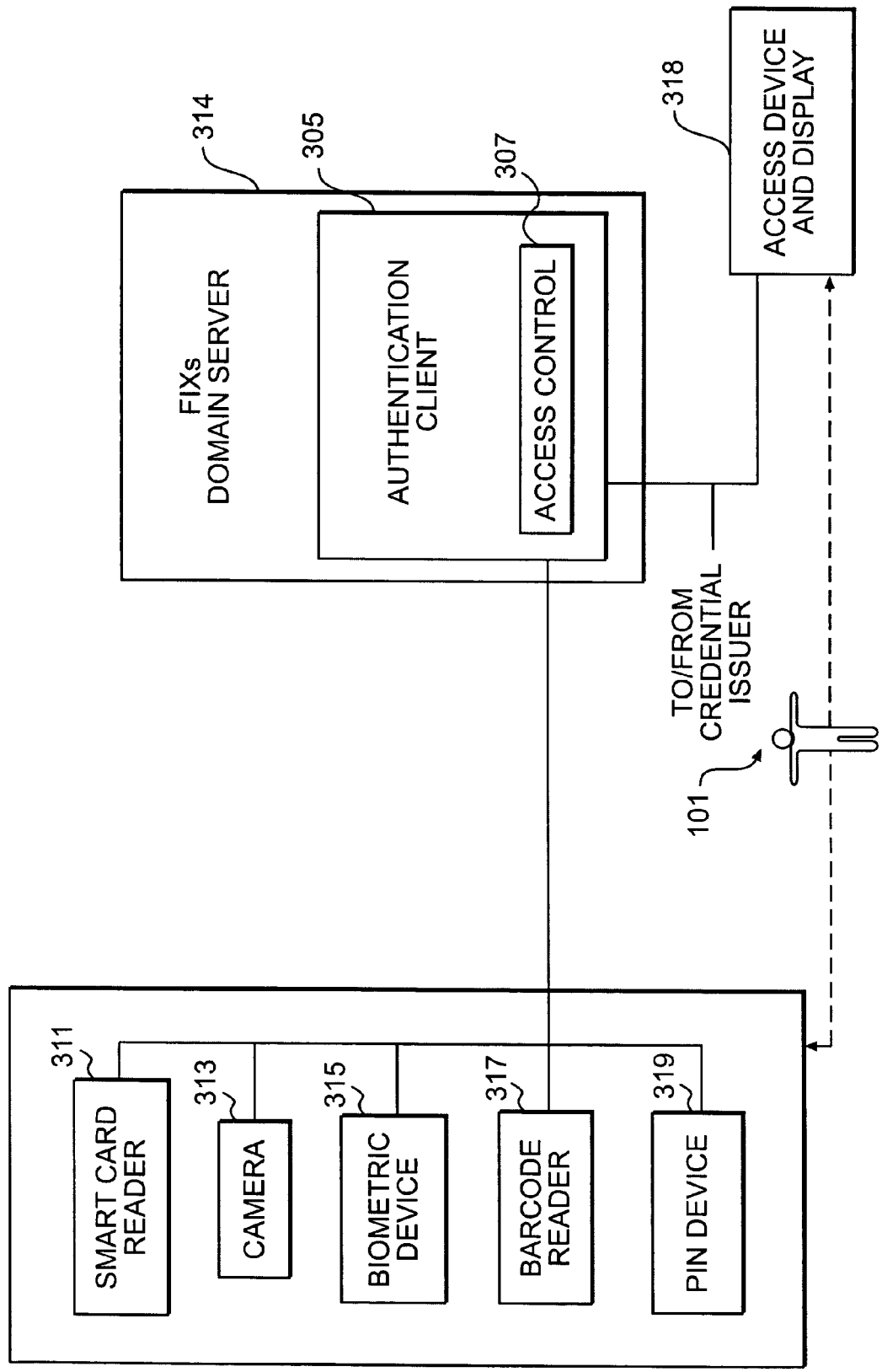
FIGS. 3A-3C are block diagrams of an embodiment of a relying party system operating in the federated credentialing system.

As noted above, a relying party can also function as an credential issuer. As such, the relying party 300 includes components similar to those of the credential issuer system 202, for example. The relying party 300 includes relying party system 302, a block diagram of which is shown in FIG. 3A. The system 302 includes FDS 314 and specific access control components 310 that are used by the relying party 300 to confirm the identity and access privileges of users who desire access to the relying party's protected resources. The components 310 used to verify identity and access privileges include a smart card reader 311, a camera 313, biometric device 315, barcode reader 317, and PIN pad 319. The smart card reader 311 is used, for example, by access control personnel at the relying party 300 to read smart cards of users desiring access to the relying party's protected resources.

The camera 313 is used to capture an image of the user 101 requesting access to the protected resources. The captured image may be used locally at the relying party 300 or may be transmitted to the FiXs network 400.

The biometric device 315 may be a fingerprint reader, a retina scanner, or some other device that captures and reads biometric data from the user.

The barcode reader 317 may be incorporated into the smart card reader 311, or may function as a separate device.

Finally, the relying party 300 may include one or more access device and display units 318. The units 318 may be employed at physical access stations and may be used by a guard or other access control personnel at the physical access stations to assist in the access process. The units 318 may be implemented as a personal computer, for example. The units 318 receive data from the credential issuer 200 (by way of, for example, an authorization response) and are coupled to the components 310.

Figure 3B:
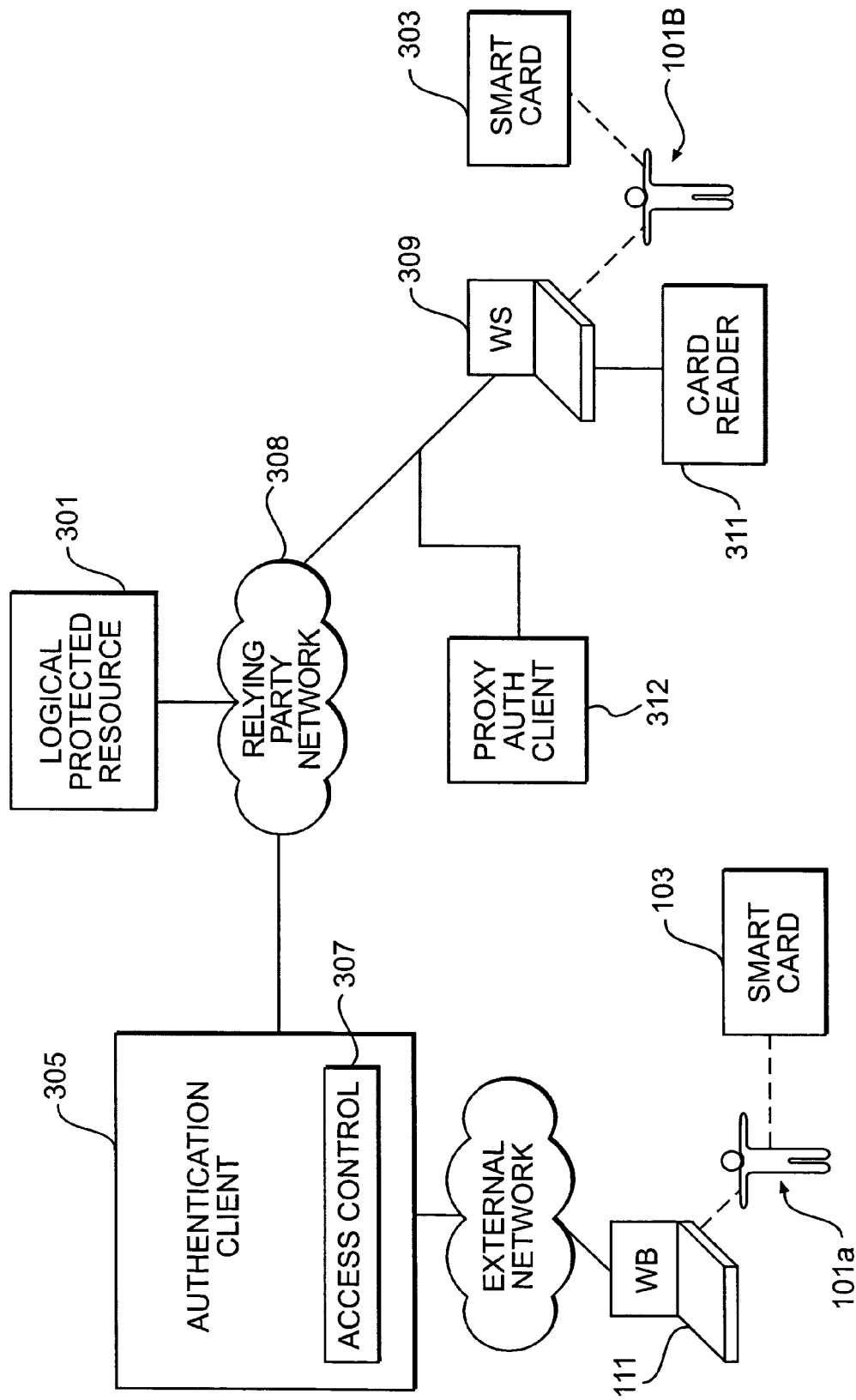

The FiXs network 400 may be adapted to provide virtual access to a relying party's protected resources. One embodiment of a virtual access scheme is shown in FIG. 3B, wherein a relying party's protected resource 301 is accessed by way of authentication client 305. In an embodiment, authentication client 305 controls access to the protected resource 301 by users external to the relying party's network, and to users who use components of the relying party's network to access the protected resource 301. For example, the protected resource 301 may be a server or database residing on relying party internal network 308. The internal network 308 may be a LAN, a WAN, or a MAN, for example. The user 101a, using external device 111, which may be a server, a workstation, a PC, or a PDA, for example, desires to access the protected resource 301. The user 101a is either physically located outside the confines of the relying party 300, or may be within the physical confines of the relying party 300, but the user's external device 111 initially is not connected to the relying party network 308. Another user 101b, who is located within the physical confines of the relying party 300 and who has been issued an access credential by the relying party 300 also wants to access the protected resource 301. The user 101b may attempt to access the protected resource 301 using the internal device 309, which may be a server, a workstation, a PC, or a PDA, for example.

The authentication client 305 may use techniques of request-response to authenticate, validate and verify the users' smart card (i.e., smart cards 103 and 303). For this purpose, the authentication client 305 may use an access control module 307 that performs at least one of authentication, validation and verification of the smart card 103/303 either by executing a public-key based software program, or by comparing one of authentication, validation and verification information received from the smart card 103/303 with corresponding information resident in a data base, such as the FiXs database 304 and enabling the user of the smart card 103/303 to access the protected resource 301 in response to a favorable comparison result.

The authentication client 305 also may be operative to transfer authentication rights to a proxy authentication client 312, which may be in the proximity of a user's internal device 309 at which the smart card 303 is inserted. The proxy authentication client 312 may be operatively associated with the access control module 307 either directly or by way of the communication network 308. The proxy authentication client 312 may be positioned in the communication network 308 in proximity to at least one of the internal devices 309. Use of the proxy authentication client 312 will be described in detail later with respect to FIG. 4B.

The protected information resource 301 may include at least one source of information to be protected, such as an intranet or a corporate LAN, a database, a hard disk and a server. The protected information resource 301 is preferably accessed using access control module 307, which may be embodied in the FiXs domain server (FDS) 314 (see FIG. 3A). The access control module 307 provides an interface to the protected information resource 301. The access control module 307 may incorporate conventional security means, such as firewalls, to prevent unauthorized entries to the system relying party system 302.

Each internal device 309 may include, or be associated with, a smart card reader 311 that operates with removable smart card 303. Alternatively, the smart card reader 311 may be replaced by a card interface (not shown), and the smart card 303 may be replaced by any conventional security chip associated with a removable unit (not shown) which may be accessed by the card interface.

The relying party system 302 is equally suitable for an open communication network, such as the Internet or an intranet coupled to the Internet, and a closed communication network that does not communicate with other networks to provide protected resource access to users having different access privileges.

Figure 3C:
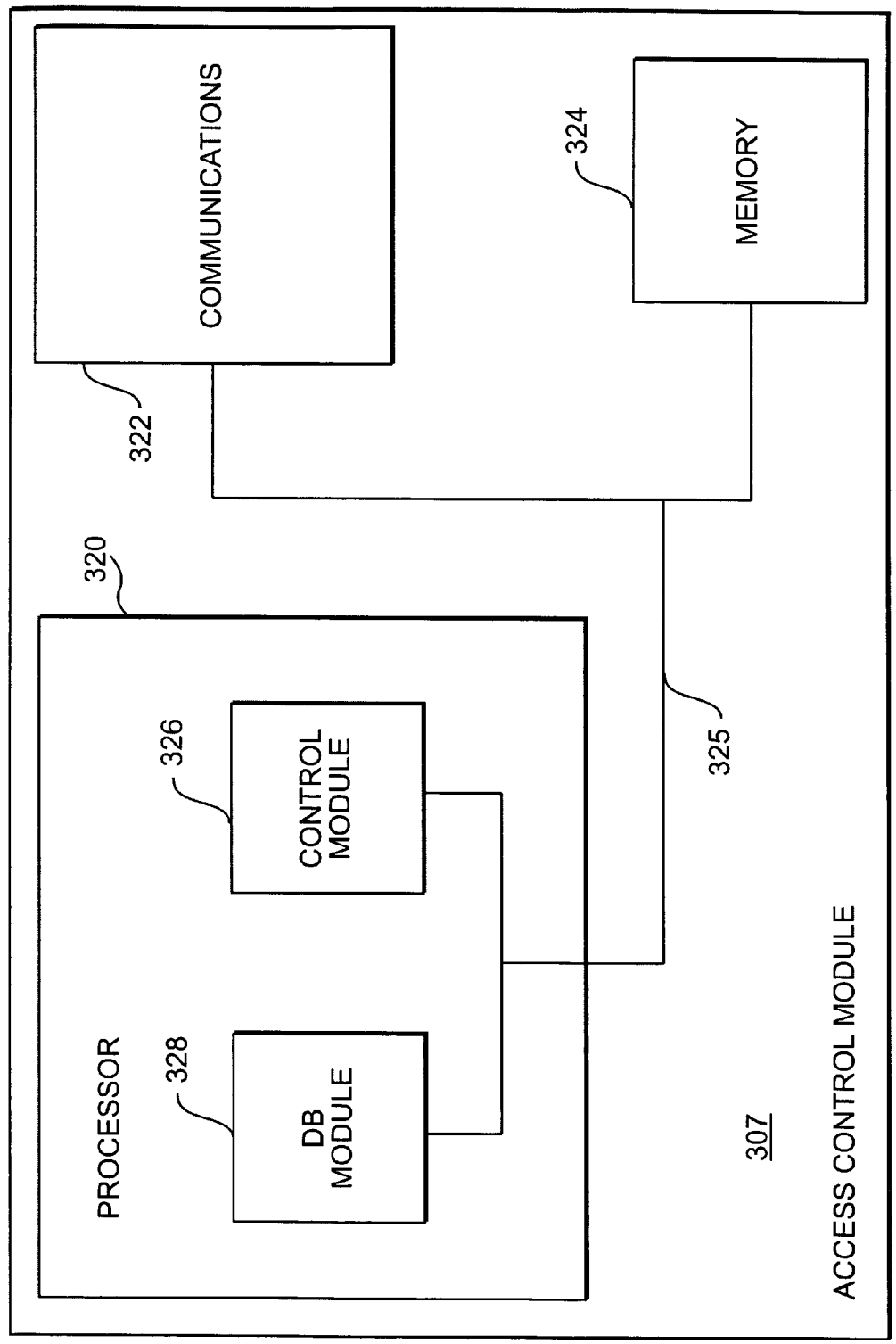

FIG. 3C is a simplified block diagram illustrating an embodiment of the access control module 307. The access control module 307 includes a processor 320, and communication apparatus 322 and a memory 324, which are each operatively associated with the processor 320. The processor 320 preferably includes a control module 326 and a data base module 328, which are operatively associated with the communication apparatus 322 and the memory 320 via a communication bus 325. Alternatively, the data base module 328 may be embodied in a data base remote from the FDS 314 (see FIG. 3A), and may serve a plurality of access control modules 307. The data base module 320 may include a local data base that may communicate with a central data base, such as the database 304 (see FIG. 3A).

Further alternatively, the data base module 328 may be optional if security algorithms performed by the access control module 307 include public-key based software programs.

The processor 320, the memory 324, and the communication apparatus 322 may be embodied in a single conventional integrated circuit (IC). Alternatively, the communication apparatus 322 may be embodied in a conventional modem (not shown). The access control module 307 also may be embodied in a conventional server unit (not shown), and may be implemented in software or in hardware, or in a combination thereof.

Returning to FIGS. 3A and 3B, the authentication client 305 alternatively may be embodied as a PC with a standard Web browser for access to the FDS 314. Each internal device 309 may contain an embedded site ID file and a set of drivers for a bar code reader, a smart card reader, and a biometric reader. The authentication client 305 processes authorization responses between the authentication client 305 and the FiXs trust broker. For example, an authentication web server application receives ID credential information from the smart card 303 or from the credential issuer 200, and returns identity information and fingerprint data for matching at the internal device 309.

The PIN pad 319 serves as a PIN entry device to be used primarily at physical access stations. For logical access, the PIN entry may be accomplished using a keyboard or similar device.

The relying party's suite of authentication devices also may include at least one device, such as a scanner, that is capable of reading user identification documents such as the user driver's license or passport.

Figure 4A:
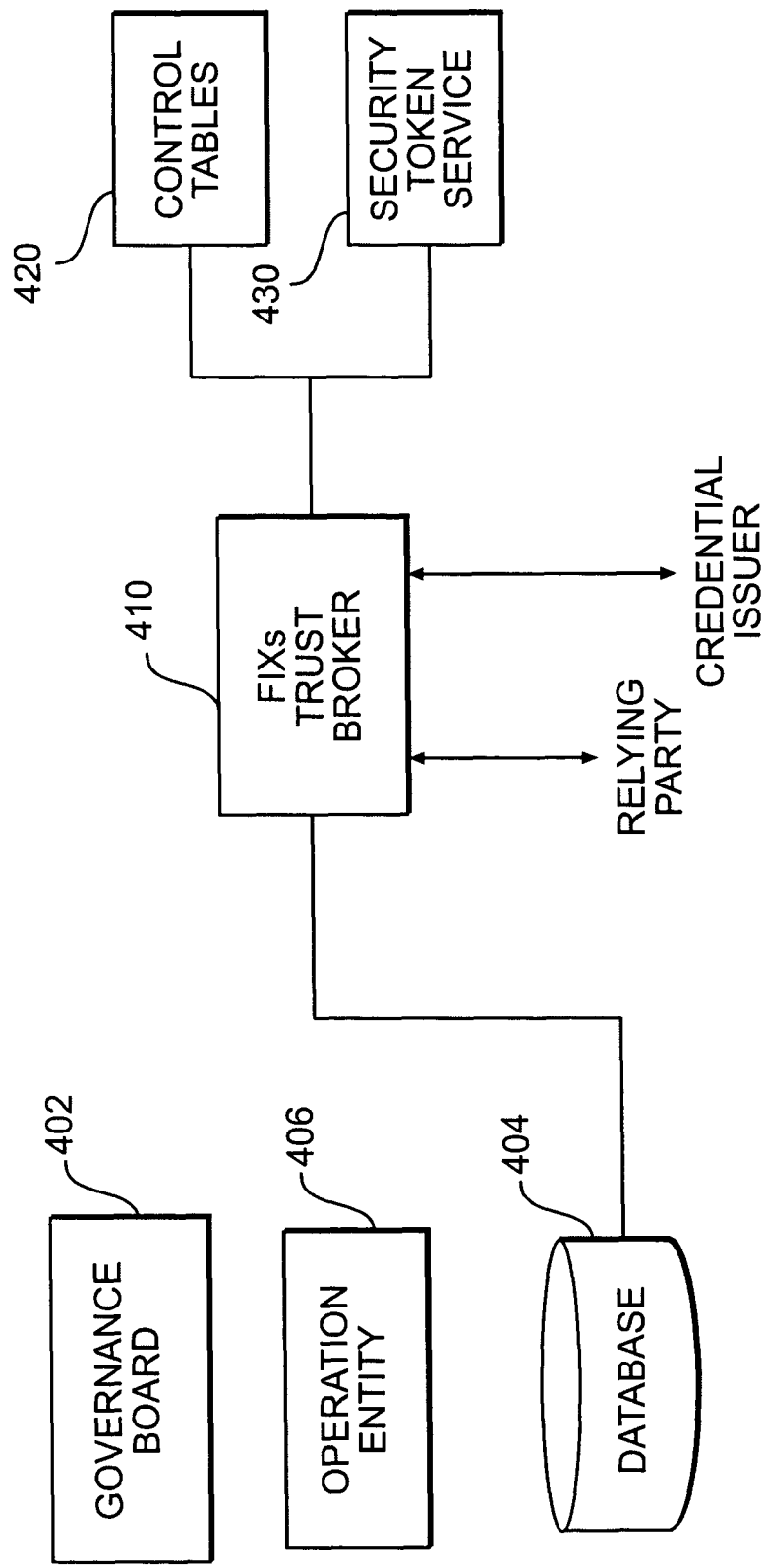
FIGS. 4A and 4B are block diagrams of a FiXs network and trust broker operative in the federated credentialing system.

FIG. 4A is a block diagram of an embodiment of the FiXs network 400. The FiXs network 400 includes the association governance board 402 and operating entity, as previously discussed with respect to FIG. 1A. The FiXs network 400 also includes FiXs trust broker (FTB) 410 and database 404. The FTB 410 servers as an intermediary between different enterprises in the federated rules-based operating system 100 of FIG. 1A. That is, the FTB 410 serves as a trusted intermediary between credential issuers and relying parties. As such, the FTB 410 provides a FiXs trust broker function that is needed, in one embodiment, to make the system 100 operational. As will be described later, however, the FTB 410 functions can be distributed among the various enterprises that comprise the system 100.

To provide the trust broker function, the FTB 410 broker maintains a set of control tables 420 that is used to share and update FiXs member organization names, characteristics, and list of acceptable authentication devices and tokens. The FTB 410 updates the control tables 420 upon activation of a new FiXs member and upon deactivation of an existing FiXs member. The FTB 410 may, in some embodiments, also update the control tables 420 upon enrollment of applicants and upon disenrollment of users.

The FTB's trust broker function is also based in part on the ability of the FTB 410 to handle, route, and in some embodiments, translate the various authentication requests and responses between relying parties and credential issuers. For example, the FTB 410 includes security token service (STS) 430 that translates authentication tokens from a format used by the credential issuer 200 to one understood by the relying party 300. More specifically, the STS 430 receives an authentication request for a user 101 from the relying party 300 and first determines the credential issuer 200 sponsoring the user 101. Using the control tables 420, the STS 430 determines the credential requirements of the relying party 300 and the credential details of the credential issuer 200. The STS 430 then determines if any translation is required by comparing the credential requirements to the credential details. For example, user identity translation may be required to map a user's identity and attributes as known to the credential issuer 200 to one that is meaningful to the relying party 300. In another example, the STS 430 may receive a request to issue an access token. As part of the authentication information of the user 101 for whom the token is to be created, the request may contain a binary token containing a username and password. The STS 430 will validate the username and password against, e.g., an LDAP runtime (typical authentication) and will invoke a KDC (Key Distribution Center) to generate an access token for the user 101. This token is returned to the authentication client at the relying party 300.

In this way, the authorization request from the relying party 300 need only identify the relying party 300, the user 101 and the user's home organization (i.e., the credential issuer). In some embodiments, the authorization request also specifies the protected resource 301 which the user 101 desires to access. By specifying specific protected resources, the authorization request allows the FTB 410, and the STS 430, to determine what level of authentication verification is required for access to the protected resources 301. For example, on the one hand, if the user desires access to a low-level security building, the level of authentication verification may be satisfied by a comparison of the smart card image to the user (i.e., a simple physical comparison) and a verification that the user's smart card 103 is authentic. On the other hand, if the user 101 desires access to a highly classified file residing on a server at the relying party 300, additional authentication steps, such as fingerprint scan and comparison may be required.

The STS 430 may, in an embodiment, function in a different manner when the user 101 is physically located remote from any logical access devices of the relying party 300 and when the user 101 is physically at a logical access device of the relying party 300. More specifically, when the user 101 desires to access a protected logical resource of the relying party 300, and the user 101 is remote from the relying party, the method shown in FIG. 5B may be invoked. As part of the credential authentication process, the STS 430 may receive an access request from the user 101, where the access request identifies the relying party 301 and the protected logical resource (e.g., the logical resource 301 of FIG. 3B). The STS 430 then consults the control tables 420 to determine what authentication requirements must be submitted to the relying party 300 in order to access the protected logical resource. The user 101 then provides the required authentication information, which is forwarded to the FTB 410 for further routing to the relying party 300. If needed, the STS 430 will perform any required credential translation before routing the authentication information to the relying party 300.

Using a trust broker allows each enterprise within a federated environment, such as the credential issuer 200 and the relying party 300, to establish a trust relationship with the trust broker rather than establishing multiple individual trust relationships with each domain in the federated environment. Although FIG. 4A shows the federated environment with a single trust broker, a federated environment may have multiple trust brokers.

Figure 4B:
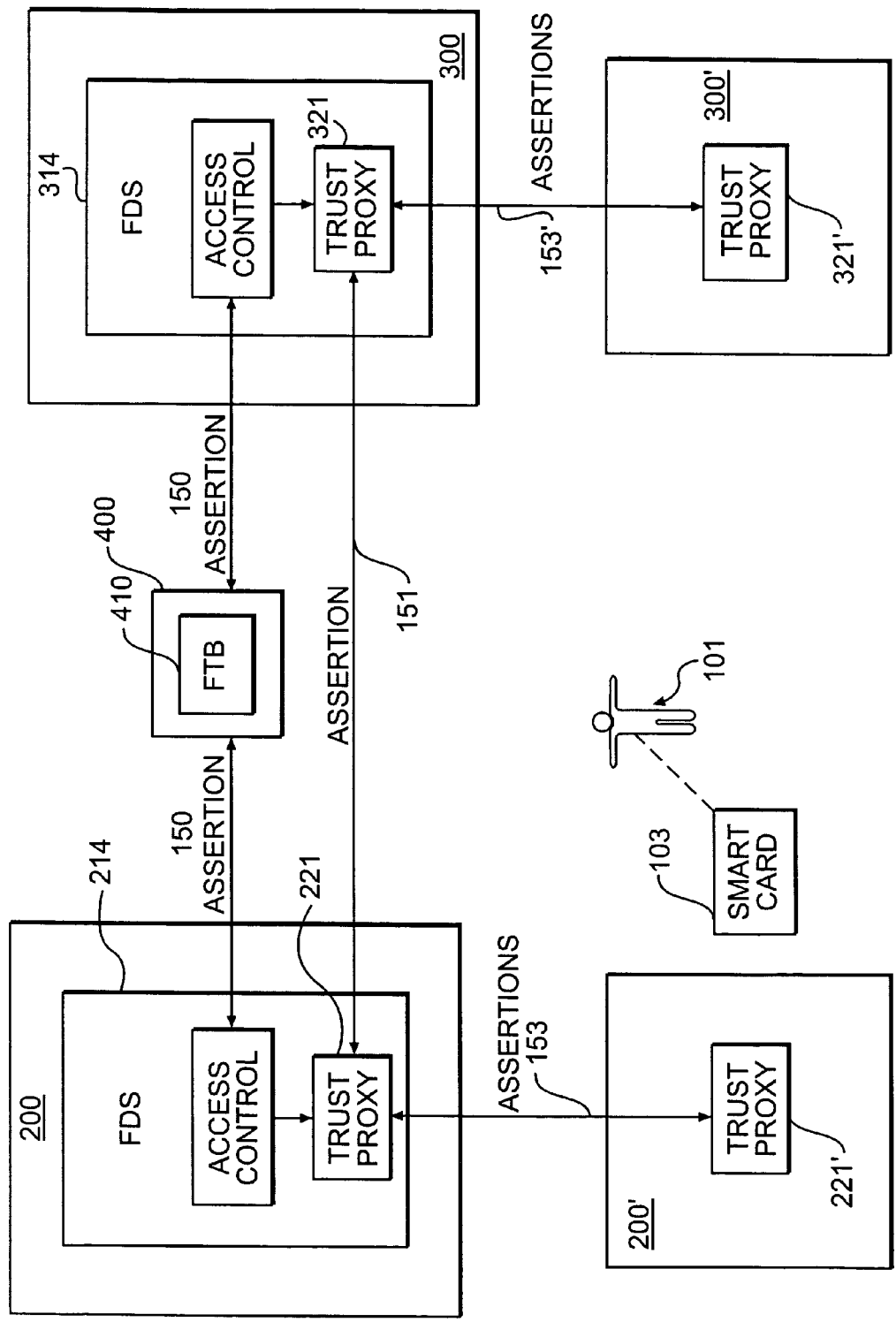

FIG. 4B shows an alternative embodiment for implementing a federated trust relationship in the system 100 of FIG. 1A. In FIG. 4B, the system 100 incorporates a trust broker along with one or more trust proxies that are distributed among one or more of the FiXs members.

A trust proxy/STS may be capable of accepting and validating many different authentication credentials, including traditional credentials such as a username and password combinations, and federated authentication token formats. A trust proxy/STS may allow the acceptance of an authentication token as proof of authentication elsewhere. The authentication token is produced by a credential issuer and is used to indicate that a user has already authenticated to a relying party. The credential issuer produces the authentication token as a means of asserting the authenticated identity of a user. A trust proxy/STS is also able to process attribute tokens or tokens that are used to secure communication sessions or conversations, e.g., those that are used to manage session information in a manner similar to an SSL session identifier.

When a relying party's trust proxy receives an authentication assertion from a credential issuer, the trust proxy knows what type of assertion that it expected and what type of assertion that it needs for internal use within the relying party. The relying party's trust proxy therefore requests that the security token service generate the required internal-use token based on the token in the received authentication assertion.

Both trust proxies and trust brokers have the ability to translate an assertion received from a credential issuer into a format that is understood by a relying party. The trust broker has the ability to interpret the assertion format (or formats) for each of the trust proxies with whom there is a direct trust relationship, thereby allowing the trust broker to provide assertion translation between a credential issuer and a relying party. This translation can be requested by either party through its local trust proxy. Thus, the credential issuer's trust proxy can request translation of an assertion before it is sent to the relying party. Likewise, the relying party's trust proxy can request translation of an assertion received from a credential issuer.

Assertion translation may include user identity translation, authentication assertion translation, attribute assertion translation, or other forms of assertion translation. Assertion translation is handled by the trust components within a federation, i.e., trust proxies and trust brokers. A trust proxy may perform the translation locally, either at the credential issuer or at the relying party, or a trust proxy may invoke assistance from a trust broker.

As shown in FIG. 4B, the credential issuer 200 includes trust proxy 221 and the relying party 300 includes trust proxy 321. The trust proxies 221/321 perform many or all of the functions as performed by the trust broker 410. Moreover, the trust proxies 221/321 establish a direct trust relationship between the credential issuer 200 and the relying party 300, allowing assertion 151 (i.e., an authorization request and response) to occur between the relying party 300 and the credential issuer 200 directly, bypassing the FiXs network 400. However, using the FTB 410, the relying party 300 and the credential issuer may still request authorization and reply (i.e., assertion 150).

Also shown in FIG. 4B are credential issuer 200' and relying party 300'. In an embodiment, the credential issuer 200' is related to the credential issuer 200 (e.g., credential issuer 200' may be a subsidiary of credential issuer 200) and similarly, the relying party 300' may be related to the relying party 300. In another embodiment, there is no enterprise relationship among the enterprises 200, 200', 300, and 300'. However, a trust relationship exists between the credential issuer 200 and the credential issuer 200'. Similarly, a trust relationship exists between the relying party 300 and the relying party 300'. Because of this trust relationship, which flows, in the case of the credential issuers, from trust proxy 221 to trust proxy 221', the enterprises are able to make authentication assertions, such as the assertions 153 and 153'. Furthermore, the addition of the trust proxies 221, 221', 321, and 321' allow for a transitive trust relationship to exist among all four enterprises shown in FIG. 4B. That is, the relying party 300' can pass assertion 153' to relying party 300', which in turn passes assertion 151 to credential issuer 200, which then passes assertion 153 to credential issuer 200', where the ultimate authentication validation is made, and an authorization response is initiated.

Figure 5A:
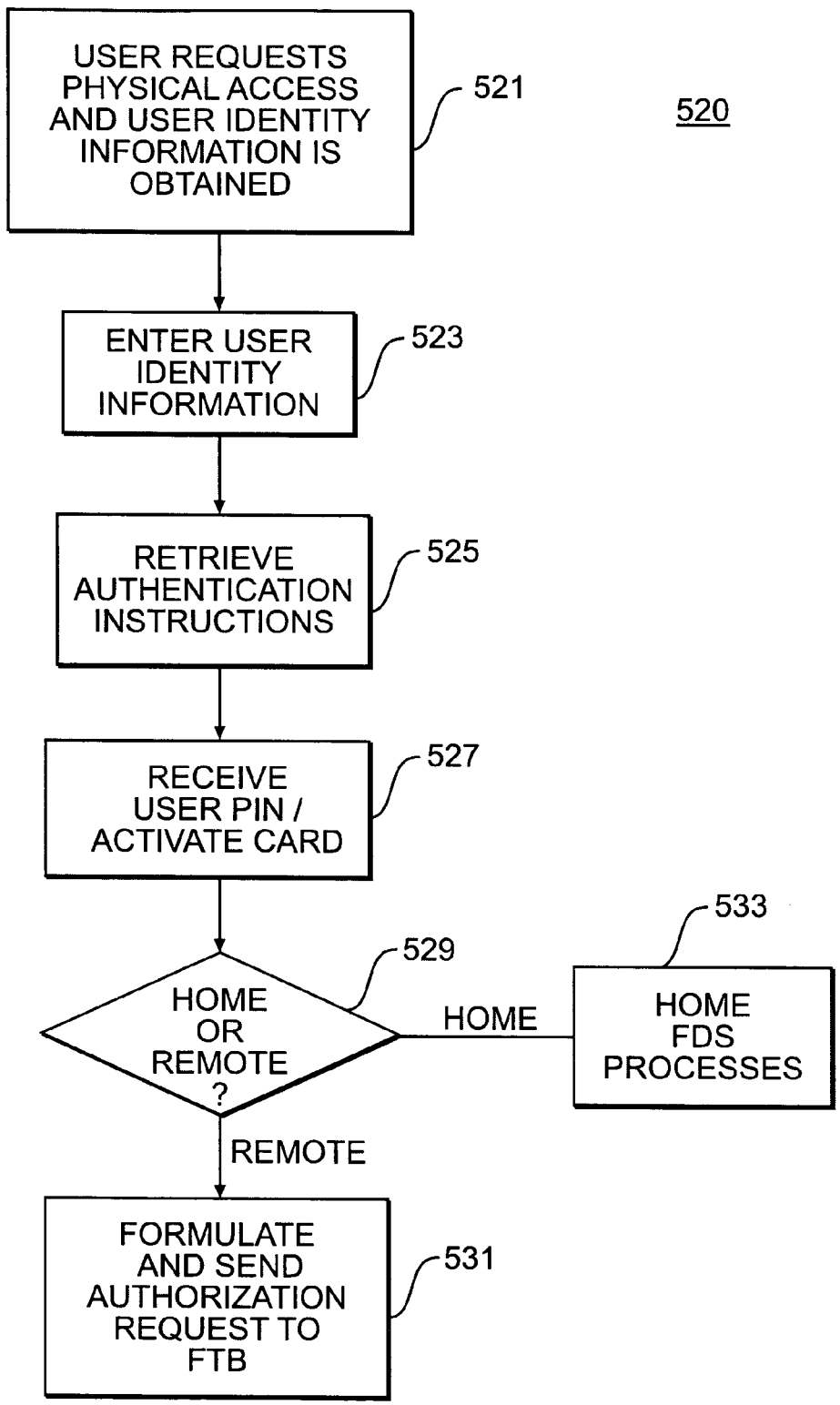
FIGS. 5A and 5B illustrate, respectively, a physical access authorization process and a logical access authorization process in the federated credentialing system.

FIG. 5A is a flowchart illustrating one embodiment of a physical access authorization process 520 operable in the system 100 of FIG. 1A. The first step (block 521) in the physical access authorization process occurs when the user 101, in one embodiment, presents his smart card 103 to a guard or other access control operator at a relying party access control point. The smart card 103 contains the user's FiXs identifier, which can be read visually and by machine. In other embodiments, the user may supply the FiXs member identification number, and the user's identification number orally, and through means of a badge or device other than the smart card 103.

In block 523, the access control operator enters the user's FiXs member identification number into a data window provided by an authentication application program. The identification number may be entered by one of several means. For example, the user's smart card 103 may be read by a card reader at the access control point, the FiXs member identification number retrieved from the smart card 103, and the retrieved number entered automatically into the data window. Alternatively, the operator may manually enter the identification number by reading the number from the card and typing the information into the data window.

Once the FiXs member identification number is entered, the authentication program will retrieve (block 525) instructions as to what data are required for authentication, and will provide instructions to the access control operator. The instructions may direct the operator to insert the user's smart card into the barcode reader, wherein either or both of barcodes on the smart card 103 are read, and the user's identification number is retrieved from the smart card 103 and transmitted to the FDS 314. Alternatively, the instructions may direct the operator to have the smart card 103 read by the smart card reader (if not already done). The user 101 then enters (block 527) the user's PIN using the PIN pad, or alternatively a keyboard, and a string of data is retrieved from the chip on the smart card 103. Finally, the operator may be directed to manually enter user information directly into the application program data window.

The authentication client 305 then determines (block 529) the appropriate transaction routing. For example, if the user 101 is an employee of the relying party 300, then the transaction is a home transaction and the data are routed to the relying party's FDS 314 for authentication processing (block 531). If the authentication client 305 determines that the request cannot be processed internally based on the provided FiXs member identification number, then the transaction is a remote transaction, and the retrieved data are provided (block 533), as part of an authorization request, to the FiXs trust broker.

Figure 5B:
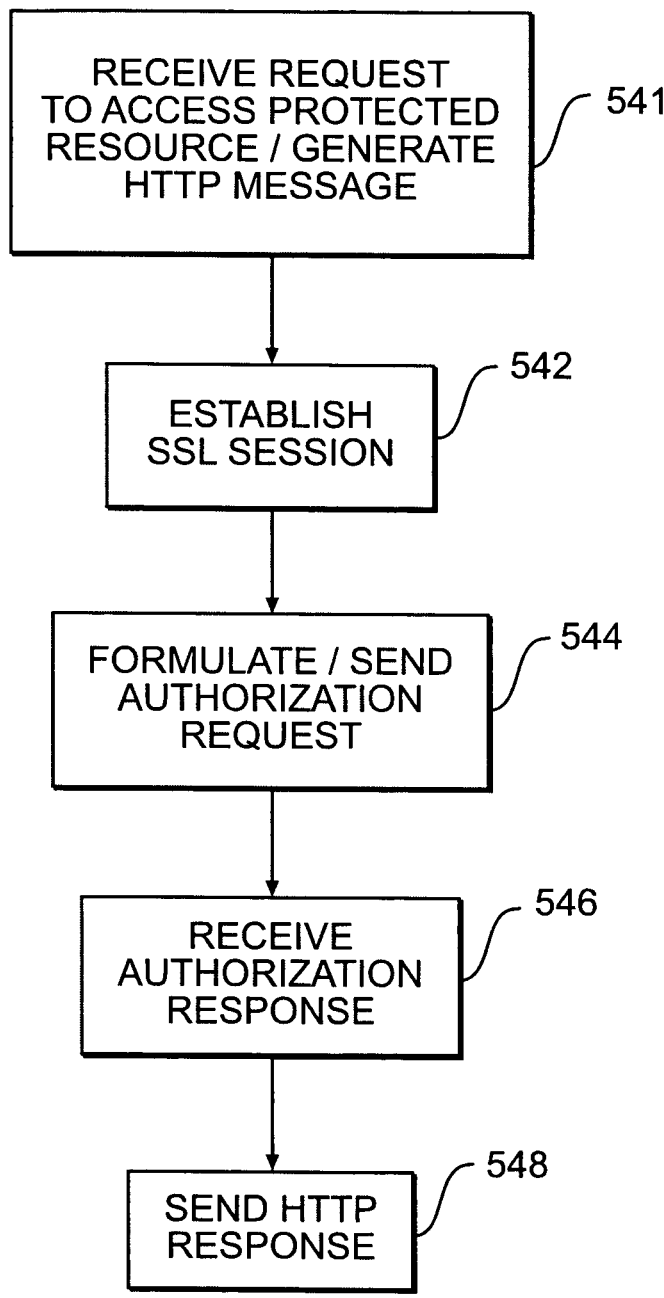

FIG. 5B is a data flow diagram that illustrates a typical authorization process 540 that may be used when a user 101 attempts to access a protected logical resource at a network device. As illustrated, the user 101 seeks access over a computer network to a protected resource on a server at the relying party 300 through the user's web browser executing on the user's workstation. The computer network may be the Internet, an intranet, or other network, as shown in FIG. 1G, and the server may be a web application server (WAS), a server application, a servlet process, or the like.

The process begins when the user 101 requests (541) a server-side protected resource, and the credential issuer 200 generates an HTTP request.

The FDS 314 initiates and completes the establishment of an SSL (Secure Socket Layer) session between the logical resource and the user's workstation (block 542), which entails multiple transfers of information between the user's workstation and the FDS 314. After an SSL session is established, subsequent communication messages are transferred within the SSL session; any protected information remains secure because of the encrypted communication messages within the SSL session.

However, the FDS 314 needs to determine the identity of the user 101 before allowing the user 101 to access the protected logical resource, so the FDS 314 initiates an authorization process by interfacing with the access authorization client 305, which in turn sends the credential issuer 200 an authorization request (block 544). The authorization request may be in various formats, such as an HTML form. The credential issuer 200 then provides the requested or required information (block 546), such as a username or other type of user identifier along with other authentication information. Alternatively, authentication could be based on an identity asserted in a certificate that is used for mutually authenticated SSL. Further alternatively, authentication could be based in part on information stored on the user's smart card 103.

When the authorization response is received at the authentication client 305, the authentication client 305 authenticates the user 101 by retrieving previously submitted registration information stored on the user's smart card 103, which was read by an associated smart card reader, and matching the presented authentication information with the user's stored information. Assuming the authentication is successful, an active session is established for the authenticated user 101. The FDS 314 creates a session identifier for the client, and any subsequent request messages from the user 101 within the session may be accompanied by the session identifier.

The FDS 314 then sends an HTTP response message to the user 101 (block 548), thereby fulfilling the user's original request for the protected resource. At that point, the user 101 may request access to another protected resource by clicking a hypertext link within a browser window, and the browser sends another HTTP request message to the credential issuer. At that point, the FDS 314 recognizes that the user 101 has an active session because the user's session identifier is returned to the FDS 314 in the HTTP request message, and the FDS 314 sends a message granting access to the protected resource. Although FIG. 5B refers to a one session process, other alternative session state management techniques may be used, such as URL rewriting or using cookies to identify users with active sessions, which may include using the same cookie that is used to provide proof of authentication.

FIGS. 6A-6D are flowcharts illustrating additional processes associated with logical and physical access in the federated operating rules-based system 100 of FIG. 1A. In the illustrated processes, some steps are optional, and are indicated as such by dashed lines. The processes also assume the system 100 comprises some or all of the components shown in FIGS. 1B-4B. When the below described processes involve an access authorization step, if the results of the step are unsatisfactory, access to the relying party's protected resources generally will be denied.

Figure 6A:
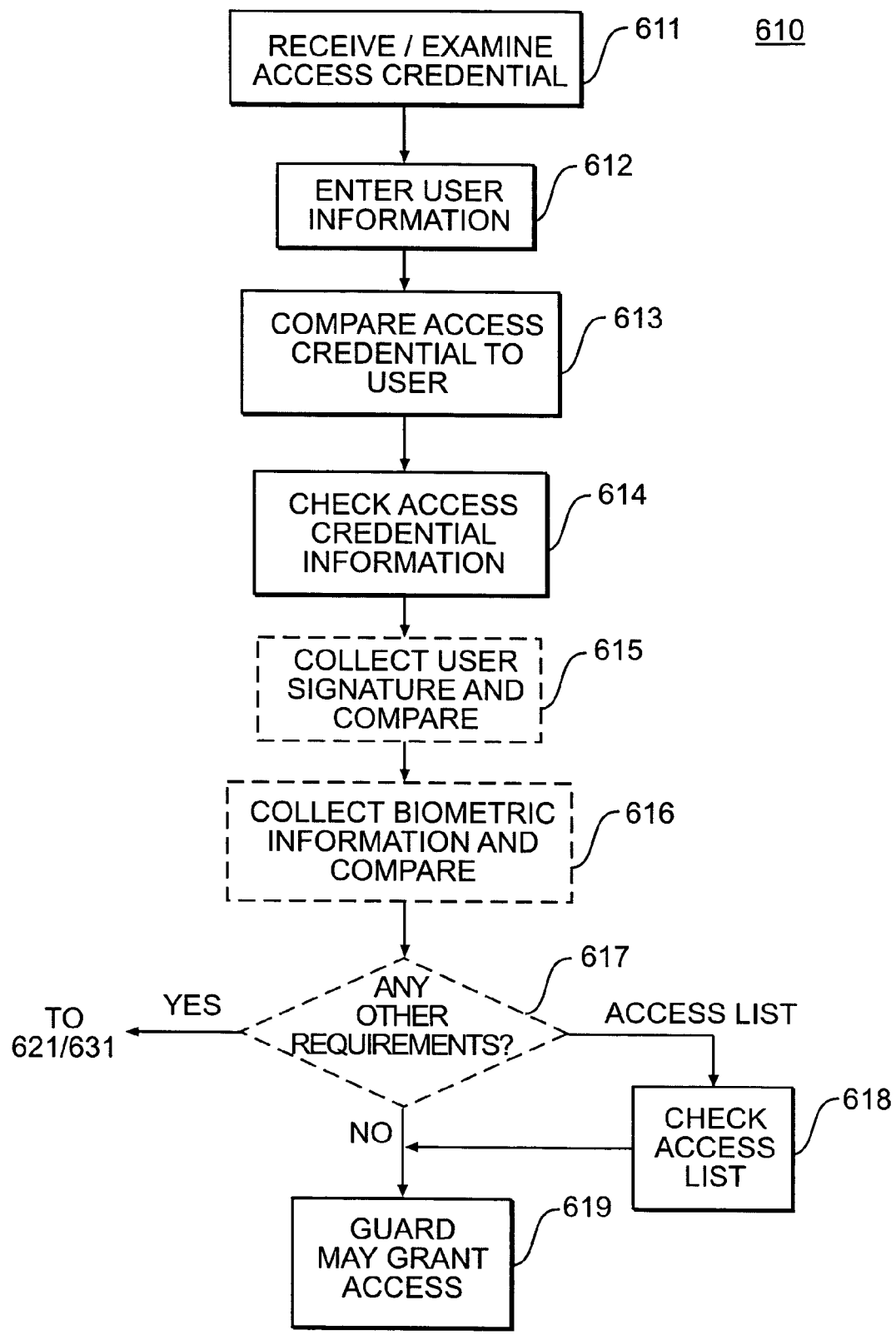
FIGS. 6A-6D are flowcharts illustrating additional access processes operative on the federated credentialing system.

FIG. 6A is a flowchart illustrating another embodiment of a physical access process. In FIG. 6A, physical access process 610 begins with block 611, wherein a guard or access control person at a physical access station receives a smart card 103 from a user 101, and the guard examines the smart card 103 to determine if there is any obvious evidence of tampering or forgery. Assuming the guard passes the smart card 103 as authentic, the process 610 moves to block 612, wherein the guard enters information identifying the credential issuer 200 that sponsors the user 101. Upon entering the credential issuer information, the authentication client 305 provides the guard, in the form of a computer display window, information identifying the credential issuer's access requirements. For example, the computer display may state that the user's smart card should include specific data fields or features, and may provide a picture of a generic smart card as issued by the credential issuer 200. The computer display may also list specific access credentials that any user 101 from the credential issuer should have, means for connecting the relying party 300 to the credential issuer 200, and other information. In an alternative process, the process of connecting the relying party 300 and the credential issuer 200 may occur automatically upon scanning of the smart card 200, or upon entry of a credential issuer identification number, for example.

The process 610 then proceeds to block 613, wherein the guard compares physical characteristics of the user as shown or otherwise provided on the smart card 103 (e.g., facial features provided in the user's photo image) with the user's actual appearance. Assuming this physical characteristics comparison is satisfactory, the process 610 moves to block 614, and the guard checks other data provided on the smart card 103, such as the expiration date, for example.

In optional block 615, the guard collects the user's signature, by, for example, having the user sign signature pad 319, for example. The guard then visually compares the provided signature with a corresponding user signature on the smart card 103.

In optional block 616, the guard collects biometric data from the user 101. For example, the guard may obtain a scan of the user's fingerprint or retina. The guard may then compete a visual comparison of the thus-obtained biometric data with corresponding data provided on the smart card 103 (e.g., in the case of a fingerprint scan).

In optional block 617, the guard access the authentication client 305, based on the user's access request, to determine the specific authorization requirements (e.g., biometric scan) the user 101 must satisfy in order to access the relying party's protected resource 301. If the authentication client 305 specifies any requirements not already satisfied by steps 610-616, the process moves to block 621 (see FIG. 6B) or 631 (see FIG. 6C). If the authentication client 305 specifies that the user 101 must appear on a pre-approved and provided access list, the guard checks (block 618) the current access list (hard copy or electronic), and if the user 101 appears on the access list, the process moves to block 619 and the guard may grant the user 101 access to the protected resource 301. If, following step 617, the authentication client 305 does not specify any additional access requirements, the process 610 moves to block 619.

Figure 6B:
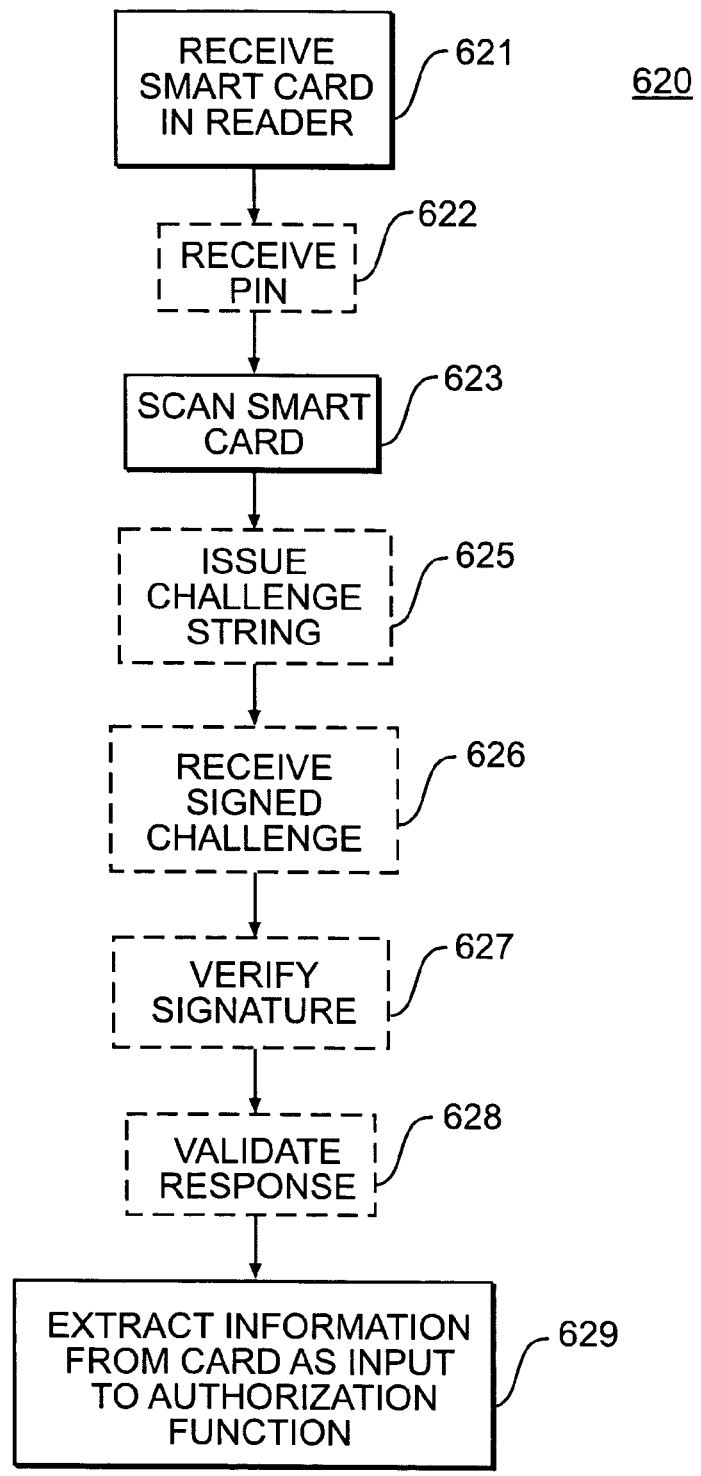

FIG. 6B is a flowchart illustrating an embodiment of a computer-based verification process 620, wherein biometric and other verification processes are completed at the local access station (i.e., at the guard's location) based on information stored in the user's smart card 103. In block 621, the user 101 places the smart card 103 in smart card reader 311. In optional block 622, the user 101 enters the user's PIN by way of, for example, PIN pad 319. Entry of the PIN causes the smart card 103 to be activated, and the smart card 103 is scanned (block 623). Scanning the smart card 103 causes the user's biometric data stored on the smart card 103 to be read into the FDS 314 where the read biometric data are compared to the biometric sample provided in step 616 above. Scanning the smart card 103 optionally also causes other information stored on the smart card 103 to be displayed at the local guard station 318, or provided to an access program, for further comparison.

In optional block 625, the authentication client 305 issues a challenge string to the smart card 103 and requests an asymmetric operation in response. In block 626, the smart card 103 responds to the challenge by signing the challenge using the user's private key and attaching an associated certificate. In block 627, the response signature is verified and a standards-compliant PKI path validation is conducted. The related digital certificate is checked to ensure that the digital certificate is from a trusted source (e.g., the credential issuer 200). The revocation status of the certificate also is checked to ensure current validity. In block 628, the response is validated as the expected response to the issued challenge. In block 629, the subject distinguished name (DN) from the authentication certificate are extracted and passed as an input to the authorization function.

Figure 6C:
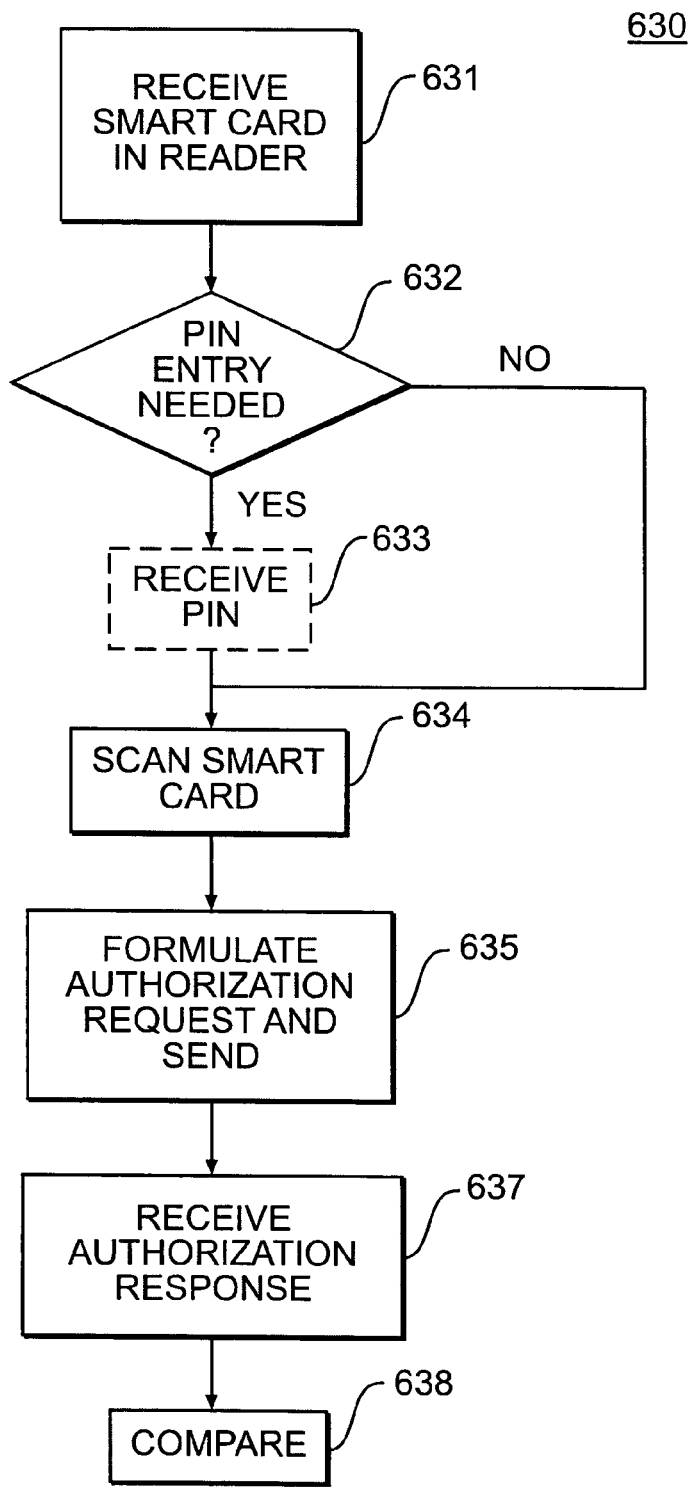

If the computer-based portion of the user's access verification is to be conducted using an authentication request and response through the trust broker 410 to the credential issuer 200, the process 610 proceeds to process 630, as shown in FIG. 6C. In block 631, the user 101 places the smart card 103 in smart card reader 311. In block 632, the authentication program determines if a PIN entry is needed to activate the smart card 103. If a PIN is needed, the process 630 proceeds to optional block 633, the user 101 is prompted to enter, and enters, the user's PIN by way of, for example, PIN pad 319. Entry of the PIN causes the smart card 103 to be activated, and the smart card 103 is scanned (block 633). If in step 632, the authentication program determines that a PIN is not needed, the process 630 proceeds to block 634 and the user's smart card 103 is scanned without the additional security of a PIN activation. Scanning the smart card 103 causes information related to the user 101 to be read from the smart card 103, displayed at the local guard station, and to be provided to the authentication client 305 to start generation of an access request. Such information may include, for example, the user's unique FiXs identification number as assigned by the user's credential issuer.

With the provided user FiXs identification number, the authentication client 305 formulates (block 635) an authorization request to be forwarded to the FiXs trust broker for further routing to the credential issuer 200. The authentication request may ask the that the user's biometric information, PKI information, or other information be supplied in an authentication response. The credential issuer 200, upon receiving the authentication request, extracts the requested information from the database 204, formulates an appropriate authentication response, and sends the authentication response to the relying party 300 by way of the FiXs trust broker. In block 637 the relying party 300 (more specifically, the authentication client 305) receives the authentication response, and provides the information contained therein to either or both the authentication program and the guard's display. In block 638 the authentication program compares information presented by the authentication response with either corresponding data from the smart card 103 (as read by the smart card reader 311) or data (e.g., biometric data) obtained contemporaneously from the user 101. In parallel with block 638, the guard may compare any displayed data on the guard's display with corresponding data as provided on the face of the smart card 103 (i.e., a human visual check) or may compare specific displayed data (e.g., facial features) with the actual user.

If in block 635 the that asymmetric cryptography information should be provided, the access request will include a challenge string to the authentication client 205, requesting an asymmetric operation in response. The authentication client 205 responds to the challenge by signing the challenge using the user's private key and attaching an associated certificate. Then, in block 638, the response signature is verified and a standards-compliant PKI path validation is conducted. The related digital certificate is checked to ensure that the digital certificate is from a trusted source (e.g., the credential issuer 200). The revocation status of the certificate also is checked to ensure current validity. In addition, the subject distinguished name (DN) from the authentication certificate are extracted and passed as an input to the authorization function.

Figure 6D:
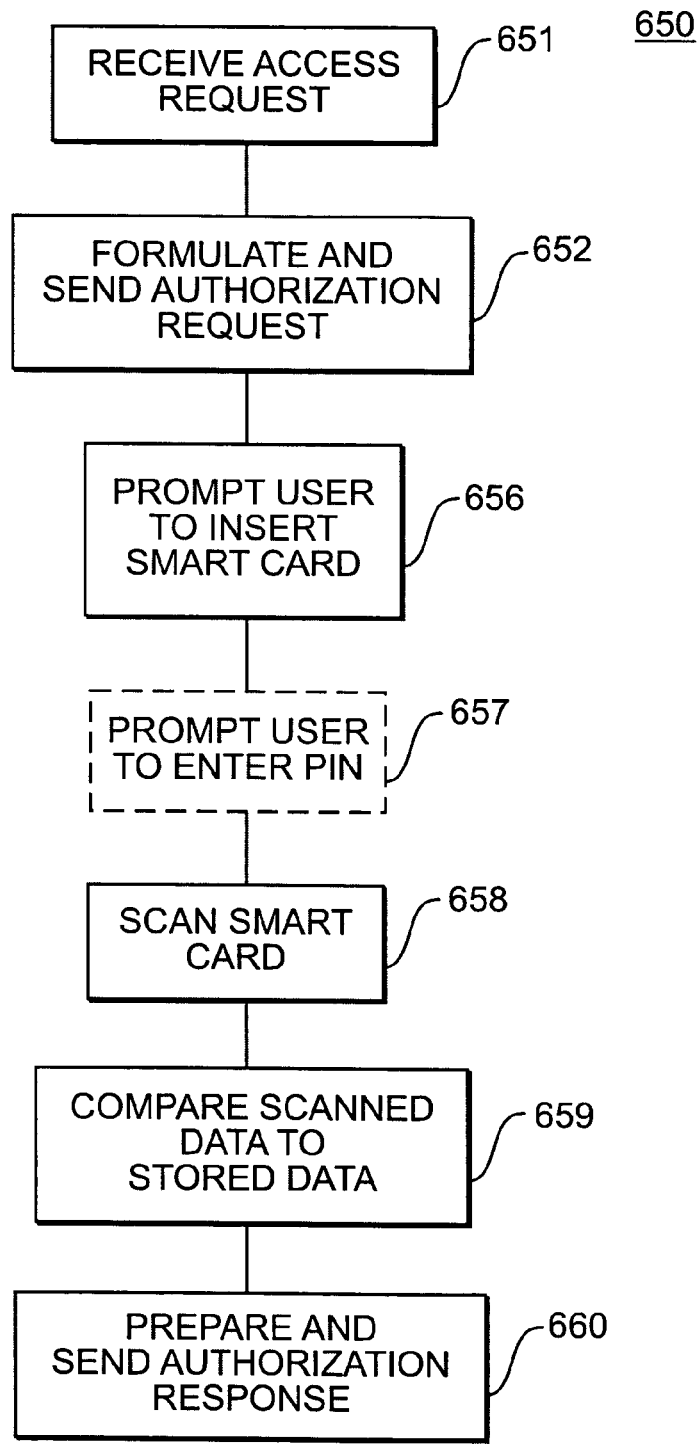

In some situations, the user 101 may desired to remotely access a logical protected resource 301 of the relying party 300. In such a situation, obviously, a guard will not be available to assist in the access authorization process. The system 100 can still accommodate such an access request by using the FiXs trust broker and authentication clients 205 and 305, for example. FIG. 6D is a flowchart illustrating a process 650 for remote authentication. The process 650 begins (block 651) when user 101 attempts to access (for example, by entering a URL) a logical resource 301. In block 652, the authentication client 305 is notified of the access request and responds by sending an authorization request to the authentication client 205 by way of the FiXs trust broker. Upon receiving the authorization request, the authentication client 205 prompts (block 656) the user 101 to insert the user's smart card 103 into smart card reader 211. Next, in optional block 657, the authentication client 205 prompts the user 101 to enter the user's PIN. The user 101 may enter the PIN by utilizing either a keyboard or a dedicated PIN pad. Entering the PIN causes the user's smart card 103 to be activated such that data on the smart card 103 may be read by the authentication client 205. In an alternative process, the PIN entry is not required, and insertion of the smart card 103 into the smart card reader 211 allows the authentication client 205 to read the smart card 103 data. In yet another alternative process, a virtual smart card is used to satisfy the authentication process, and entry of the PIN activates the virtual smart card.

In block 658, the authentication client 205 reads the required data from the smart card 103 (or from the virtual smart card) and compares (block 659) the data thus read to corresponding data in the user's FiXs file contained, for example, in FiXs repository 217. Alternatively, or in addition, the authentication client 205 may prompt the user to provide a biometric sample (e.g., a fingerprint scan). The thus-provided biometric sample is compared to corresponding data contained, in one alternative, in the smart card 103, and in another alternative, in the FiXs repository 217. In still another alternative, the authentication client 205 may prompt the user to provide a signature for comparison, or to submit a current facial image (using, for example, camera 313). The thus provided information is also compared to corresponding data stored on the smart card 103 or the FiXs repository 217. If the comparison is satisfactory, the process moves to block 660, whereupon the authentication client 205 prepares an authentication response for transmission to the FiXs trust broker 410 and ultimately to the authentication client 305. Upon receipt of the authentication response, the authentication client 305 grants the user 101 access to the protected resource. In block 659, if the comparison is unsatisfactory, the authentication client 205 so notifies the user 101 and the authentication client 305. The process 650 then ends.

What is claimed is:

1. A federated credentialing system in which a plurality of credential issuers interact with a plurality of relying parties to provide system users with access to protected resources within the system, the system being executed on a computer including a memory and a processor, the system comprising:
a relying party federated domain server including means for identifying users and authenticating user access credentials using the processor;
a credential issuer domain server including means for verifying user identities and access credentials using the processor, wherein the access credentials comprise a single homeland security presidential directive 12(HSPD-12) compliant smart card that includes a signature panel to obtain an actual signature from a user, and wherein the single HSPD-12 compliant smart card are operative to provide user access to both logical and physical protected resources of the relying party; and
a federated trust broker in communication with the relying party and credential issuer federated domain servers, wherein the trust broker receives authorization requests from the relying party, routes the received requests to the credential issuer and receives in return authorization responses from the credential issuer and routes the responses to the relying party, and wherein the relying party grants users access to the physical and the logical protected resources based on information contained in the responses.

2. The federated credentialing system of claim 1, wherein the single HSPD-12 compliant smart card comprises a virtual smart card that replicates information stored on a contact smart card or a contactless smart card, the information being stored in a memory on the credential issuer domain server.

3. The federated credentialing system of claim 1, wherein the single HSPD-12 compliant smart card comprises an enhanced bar code, the enhanced barcode comprising a background bar code, and a graphic superimposed over the background barcode.

4. The federated credentialing system of claim 3, wherein the enhanced bar code includes reference marks to account for possible misalignment of the enhanced bar code during an encoding process.

5. The federated credentialing system of claim 3, wherein the graphic comprises a user signature based on a digital bit map.

6. The federated credentialing system of claim 1, wherein the trust broker comprises means for translating user identification and access credential information into formats recognized by the federated domain servers.

7. The federated credentialing system of claim 1, wherein the trust broker provides an indirect trust relationship between a relying party and a credential issuer, and wherein the relying party accepts the credential issuer's assertion of user identification and access credential authentication.

8. The federated credentialing system of claim 7, further comprising a credential issuer trust proxy and a relying party trust proxy, wherein the trust proxies are operative to transmit trusted authorization request and response messages thereby establishing a direct trust relationship between the relying party and the credential issuer.

9. The federated credentialing system of claim 8, wherein the trust proxies are operative to translate an assertion received from the credential issuer into a format that is understood by the relying party.

10. The federated credentialing system of claim 1, wherein the single HSPD-12 compliant smart card further comprises:
biometric data operative to verify and identification of a user; and
a Card Holder Unique Identifier (CHUID), wherein the CHUID is tied to the biometric data such that the CHLTID uniquely identifies the user.

11. The federated credentialing system of claim 1, wherein the single HSPD-12 compliant smart card further comprises digital signature data operative to authenticate the single HSPD-12 compliant smart card.

12. The federated credentialing system of claim 1, further comprising means to read data from the single HSPD-12 compliant smart card, and wherein the single HSPD-12 compliant smart card is activated upon entry of a user PIN.

13. The federated credentialing system of claim 1, further comprising a set of operating rules, wherein the relying parties and the credential issuers agree to conform to the operating rules, the operating rules governing use of the single HSPD-12 compliant smart card for authorizing access to the physical and logical protected resources.

14. The federated credentialing system of claim 13, wherein the operating rules specify procedure for user identification and access credential authentication.

15. The federated credentialing system of claim 13, wherein the operating rules govern enrollment of users into the federated credentialing system.

16. The federated credentialing system of claim 1, wherein the users are subject to periodic review and revalidation.

17. The federated credentialing system of claim 1, wherein the federated trust broker provides virtual access to the protected resources of the relying party using an authentication client.

18. The federated credentialing system of claim 1, wherein the federated trust broker maintains a set of control tables to share and update member organization names, characteristics, and a list of acceptable authentication devices and tokens.

19. The federated credentialing system of claim 1, wherein the users can remotely access a logical protected resource of the reply party.

20. The federated credentialing system of claim 1, further comprising a federation for identity and cross-credentialing systems (FiXs) network that routes the authentication requests from the relying parties to the credential issuers, and transmits the corresponding responses.

21. A method for granting access to protected logical and physical resources in a federated credentialing network comprising a plurality of relying parties and a plurality of credential issuers, the method being executed on a computer including a memory and a processor, the method comprising:
   at a relying party:
      receiving a request from a user to access a protected resource, the user providing a user access credential including digital data related to the user, wherein the user access credential is a single HSPD-12 compliant smart card that includes a signature panel to obtain an actual signature from a user, the single HSPD-12 compliant smart card operative to provide access to both the logical and the physical protected resources;
      identifying a credential issuer responsible for the user using the processor;
      formulating an authorization request using the processor; and
      sending the authorization request to a trust broker operating on the federated credentialing network;
   at the trust broker;
      translating the authorization request into a format required by the credential issuer; and
      sending the translated authorization request to the identified credential issuer; and
   at the credential issuer:
      providing information, according to agreed-upon operating rules, sufficient to verify an identity of the user and to authenticate the user access credential; and
      sending the information to the relying party through the trust broker in an authorization response, wherein the relying party grants access to the protected resource based on comparing information in the authorization response to information provided from the access credential.

22. The method of claim 21, further comprising reading the single HSPD-12 compliant smart card at the relying party, the single HSPD-12 compliant smart card providing user biometric information and a user digital signature.

23. The method of claim 22, wherein reading the single HSPD-12 compliant smart card comprises receiving a user PIN, wherein the single HSPD-12 compliant smart card is activated to supply digital data contained on the single HSPD-12 compliant smart card.

24. The method of claim 21, wherein the HSPD-12 compliant smart card comprises one of a contact smart card, a contactless smart card, and a virtual smart card.

25. The method of claim 21, wherein the single HSPD-12 compliant smart card comprises an enhanced bar code, the enhanced barcode comprising a background bar code, and a graphic superimposed over the background barcode.

26. The method of claim 25, wherein the graphic comprises a user signature based on a digital bit map.

27. The method of claim 21, further comprising providing a set of operating rules, wherein the relying parties and the credential issuers agree to conform to the operating rules, the operating rules governing use of the single HSPD-12 compliant smart card for authorizing access to the physical and logical protected resources.

28. The method of claim 21, wherein the operating rules specify procedure for user identification and access credential authentication.

29. The method of claim 21, wherein the operating rules govern enrollment of users into the federated credentialing system.

30. The method of claim 21, wherein the federated credentialing network is a federation for identity and cross-credentialing systems (FiXs) network that routes the authentication request from the relying party to the credential issuer, and transmits the authentication response.

31. A method for granting access to protected resources in a federated network of unrelated enterprises, the method being executed on a computer including a memory and a processor, the method comprising:
   establishing a set of operating rules using the processor, wherein each enterprise agrees to conform to the operating rules;
   establishing a trust relationship among the enterprises using the processor, the trust relationship allowing the enterprises to communicate protected resource access authorization requests and corresponding responses according to the operating rules, wherein information supplied in the responses can be trusted for granting access to the protected resources; and
   presenting an access request to an enterprise, the access request specifying a logical or a physical protected resource, the access request presented in conjunction with presentation of a single HSPD-12 compliant smart card that conforms to the operating rules and that operates to allow access to both the physical and the logical protected resources, wherein the single HSPD-12 compliant smart card includes a signature panel to obtain an actual signature from a user.

32. The method of claim 31, further comprising, in response to the access request:
   scanning digital data contained in the single HSPD-12 compliant smart card;
   comparing the scanned data to corresponding data provided with an authorization response; and
   basing an access grant on the comparison.

33. The method of claim 32, wherein the comparing step compares one or more of biometric information, digital signature, and visual information.

34. The method of claim 31, wherein the federated network is a federation for identity and cross-credentialing systems (FiXs) network that routes the protected resource access authorization requests from the enterprises to a credential issuer, and transmits the corresponding responses.

* * * * *